United States Patent
Gomez-Hidalgo Perez et al.

(10) Patent No.: US 12,388,783 B2
(45) Date of Patent: Aug. 12, 2025

(54) FIRST NODE, SECOND NODE, THIRD NODE, COMMUNICATIONS SYSTEM AND METHODS PERFORMED, THEREBY FOR VERIFYING THE SECOND NODE AS A SERVER FOR AN APPLICATION

(71) Applicant: Telefonaktiebolaget LM Ericsson (publ), Stockholm (SE)

(72) Inventors: Victor Gomez-Hidalgo Perez, Torrijos Toledo (ES); Carlota Villasante Marcos, Madrid (ES); Antonio Camas Maestre, Madrid (ES); Miguel Angel Julian Aguilar, Madrid (ES); Juan Francisco Canton Padilla, Madrid (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 18/577,203

(22) PCT Filed: Oct. 28, 2021

(86) PCT No.: PCT/EP2021/080046
§ 371 (c)(1),
(2) Date: Jan. 5, 2024

(87) PCT Pub. No.: WO2023/280428
PCT Pub. Date: Jan. 12, 2023

(65) Prior Publication Data
US 2024/0380727 A1    Nov. 14, 2024

(30) Foreign Application Priority Data

Jul. 6, 2021 (EP) .................... 21382608

(51) Int. Cl.
*G06F 15/16* (2006.01)
*H04L 9/40* (2022.01)
(Continued)

(52) U.S. Cl.
CPC ........ *H04L 61/5007* (2022.05); *H04L 63/166* (2013.01); *H04W 8/26* (2013.01); *H04W 12/069* (2021.01); *H04W 76/10* (2018.02)

(58) Field of Classification Search
CPC .... H04L 61/5007; H04L 63/166; H04W 8/26; H04W 12/069; H04W 76/10
(Continued)

(56) References Cited

U.S. PATENT DOCUMENTS

| | | | |
|---|---|---|---|
| 8,953,798 B2* | 2/2015 | Rossi | H04W 12/062 380/255 |
| 9,319,223 B2* | 4/2016 | Nix | H04L 9/321 |

(Continued)

OTHER PUBLICATIONS

International Search Report and Written Opinion dated Feb. 14, 2022 in International Application No. PCT/EP2021/080046 (9 pages).
(Continued)

*Primary Examiner* — Moustafa M Meky
(74) *Attorney, Agent, or Firm* — Rothwell, Figg, Ernst & Manbeck, P.C.

(57) ABSTRACT

A computer-implemented method, performed by a first node (111), for verifying a second node (112) as a server for an application. The first node (111) obtains (301), from a third node (113), a first request to verify a first Internet Protocol (IP) address for a first domain for the application. The first request indicates the first domain and the first IP address. The first node (111) sends (304) a first connection request to the second node (112) using the first IP address. The first connection request comprises the first domain indicated in the first request. The first node (111) receives (305), in
(Continued)

response to the sent first connection request, an indication from the second node (112). The indication comprises a certificate of the second node (112). The first node (111) also sends (307) a message to the third node (113) based on a result of the validation and authentication.

18 Claims, 13 Drawing Sheets

(51) Int. Cl.
 *H04L 61/5007* (2022.01)
 *H04W 8/26* (2009.01)
 *H04W 12/069* (2021.01)
 *H04W 76/10* (2018.01)

(58) Field of Classification Search
 USPC .......................................................... 709/245
 See application file for complete search history.

(56) References Cited

U.S. PATENT DOCUMENTS

| | | | |
|---|---|---|---|
| 9,419,942 B1 | 8/2016 | Buruganahalli et al. | |
| 9,641,327 B2* | 5/2017 | Nix | H04L 63/0435 |
| 9,912,644 B2* | 3/2018 | Cunningham | H04L 63/0428 |
| 10,178,086 B2* | 1/2019 | Mattsson | H04L 63/102 |
| 10,498,530 B2* | 12/2019 | Nix | H04L 9/088 |
| 10,609,020 B2* | 3/2020 | Mattsson | H04W 8/005 |
| 10,630,489 B2* | 4/2020 | Hughes | H04L 9/3268 |
| 10,819,692 B2* | 10/2020 | Leblond | H04L 67/12 |
| 11,277,395 B2* | 3/2022 | Leblond | H04L 67/12 |
| 11,521,205 B2* | 12/2022 | Liu | H04L 9/3239 |
| 11,678,181 B2* | 6/2023 | Netanel | H04W 4/70 370/254 |
| 12,013,684 B2* | 6/2024 | Malm | G06K 7/1417 |
| 2012/0110326 A1* | 5/2012 | Rossi | H04W 12/062 713/162 |
| 2016/0044000 A1* | 2/2016 | Cunningham | H04L 9/0825 713/168 |
| 2017/0223054 A1 | 8/2017 | Wing et al. | |
| 2019/0036908 A1* | 1/2019 | Liu | H04L 9/14 |
| 2019/0074982 A1* | 3/2019 | Hughes | H04L 9/0863 |
| 2019/0097793 A1* | 3/2019 | Nix | H04L 63/0807 |
| 2019/0109841 A1* | 4/2019 | Mattsson | H04L 63/145 |
| 2021/0158346 A1* | 5/2021 | Liu | G06Q 20/223 |
| 2021/0160694 A1* | 5/2021 | Netanel | H04W 4/70 |
| 2022/0308555 A1* | 9/2022 | Malm | G05B 19/41845 |
| 2024/0302819 A1* | 9/2024 | Malm | G05B 19/41845 |

OTHER PUBLICATIONS

3GPP TS 23.501 V17.0.0, (Mar. 2021), Technical Specification, 3rd Generation Partnership Project; Technical Specification Group Services and System Aspects; System architecture for the 5G System (5GS); Stage 2 (Release 17) (489 pages).

* cited by examiner a)

b)

a)

b)

a)

b)

a)

b)

FIRST NODE, SECOND NODE, THIRD NODE, COMMUNICATIONS SYSTEM AND METHODS PERFORMED, THEREBY FOR VERIFYING THE SECOND NODE AS A SERVER FOR AN APPLICATION

CROSS REFERENCE TO RELATED APPLICATIONS

This application is a 35 U.S.C. § 371 National Stage of International Patent Application No. PCT/EP2021/080046, filed 2021 Oct. 28, which claims priority to European Patent Application No. EP21382608.4, filed 2021 Jul. 6, which is incorporated by this reference.

TECHNICAL FIELD

The present disclosure relates generally to a first node and methods performed thereby for verifying a second node as a server for an application. The present disclosure also relates generally to the second node, and methods performed thereby for verifying the second node as the server for the application. The present disclosure also relates generally to a third node, and methods performed thereby for verifying the second node as the server for the application. The present disclosure further relates generally to a communications system and methods performed thereby for verifying the second node as the server for the application.

BACKGROUND

Computer systems in a communications network may comprise one or more network nodes. A node may comprise one or more processors which, together with computer program code may perform different functions and actions, a memory, a receiving port and a sending port. A node may be, for example, a server. Nodes may perform their functions entirely on the cloud.

The communications network may cover a geographical area which may be divided into cell areas, each cell area being served by another type of node, a network node in the Radio Access Network (RAN), radio network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or Base Transceiver Station (BTS), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as user equipments, with serving beams.

The standardization organization Third Generation Partnership Project (3GPP) is currently in the process of specifying a New Radio Interface called Next Generation Radio or New Radio (NR) or 5G-UTRA, as well as a Fifth Generation (5G) Packet Core Network, which may be referred to as 5G Core Network, abbreviated as 5GC.

A 3GPP system comprising a 5G Access Network (AN), a 5G Core Network and a UE may be referred to as a 5G system.

FIG. 1 is a schematic diagram depicting a particular example of a 5G reference architecture as defined by 3GPP, which may be used as a reference for the present disclosure. The Unified Data Repository (UDR) 1 may store data grouped into distinct collections of subscription-related information: subscription data, policy data, structured data for exposure, and application data. The Session Management Function (SMF) 2 may support different functionalities, e.g., Session Establishment, modify and release, and policy related functionalities such as termination of interfaces towards policy control functions, charging data collection, support of charging interfaces and control and coordination of charging data collection at the User Plane function (UPF) 3. Specifically, for the context of this document, the SMF 2 may receive Policy and Charging Control (PCC) rules from the Policy Control Function (PCF) 4 and may configure the UPF 3 accordingly through the N4 reference point 5. The UPF 3 may support handling of user plane traffic based on the rules received from the SMF 2, e.g. packet inspection and different enforcement actions such as reporting for charging and Quality of Service (QOS) handling. The PCF 4 may be understood to support a unified policy framework to govern the behavior of the network. The PCF 3 may provide Policy and Charging Control (PCC) rules to the Policy and Charging Enforcement Function (PCEF). The PCF 3 may provide policy rules to a UE through the Access and Mobility Function (AMF) 6. The AMF 6 may manage access of the UE. For example, when the UE may be connected through different access networks, and mobility aspects of the UE. Specifically, the AMF 6 may be used to forward UE rules from the PCF 4 to the UE. An Application Function (AF) 7 may interact with the 3GPP Core Network through a Network Exposure Function (NEF) 8. Specifically in the context herein, the AF 6 may allow external parties to use the Exposure Application Program Interfaces (APIs) offered by the network operator. The NEF 7 may support different functionality, e.g., different Exposure APIs. Also depicted in FIG. 1 are a Network Data Analytics Function (NWDAF) 9, and a Charging Function (CHF) 10. Each of the UDR 1, the NEF 8, the NWDAF 9, the AF 7, the PCF 4, the CHF 10, the AMF 6, the SMF 2 and the UPF 3 may have an interface through which they may be accessed, which as depicted in the Figure, may be, respectively: Nudr 11, Nnef 12, Nnwdaf 13, Naf 14, Npcf 15, Nchf 16, Namf 17, Nsmf 18 and N4 5.

Traffic Encryption and Network Management

Traffic encryption is growing significantly in mobile networks and at the same time, the encryption mechanisms are growing in complexity. Most applications today are not based on Hypertext Transport Protocol (HTTP) cleartext, but instead they may be based on Hypertext Transport Protocol Secure (HTTPS) using Transport Layer Security (TLS). Additionally, a significant part of the traffic may be based on Quick UDP Internet Connection (QUIC) transport, which may be understood to have an encryption level higher than TLS. In the future, it is foreseen that most apps will be based on QUIC transport.

TLS Server Name Indication

The TLS protocol may be understood to specify an extension known as Server Name Indication (SNI). It may be common for content servers to host multiple origins behind a single Internet Protocol (IP)-address. In order to route application flows to the correct server without having to decrypt the entire flow, the SNI extension was introduced.

The SNI extension may be sent by the client in the Client Hello message and may contain a clear text string of the domain name of the server that the client may be attempting to connect to. Since the SNI field may be sent in clear text, it may be commonly used by on-path network elements to classify flows.

TLS 1.3, and QUIC, Server Name Indication Encryption

At the Internet Engineering Task Force (IETF), for TLS 1.3, it is proposed to encrypt the SNI extension. There are several IETF drafts on this, specifically draft-ietf-tls-esni-10 "TLS Encrypted Client Hello", which has been adopted by the TLS working group. Additionally, apart from the TLS Client Hello, the rest of the TLS handshake in TLS 1.3 has a higher level of encryption as compared with previous TLS versions, e.g. in TLS 1.3 the Server Certificate is encrypted, and the subject common name or common name is encrypted as well)

QUIC may be understood to be a User Datagram Protocol (UDP)-based, stream-multiplexing, encrypted transport protocol. QUIC may be basically understood to be a UDP based replacement for the Transmission Control Protocol (TCP). QUIC is now finishing standardization at IETF and relies on TLS 1.3, so QUIC based applications may also have the Server Name Indication (SNI) extension encrypted.

Domain Name System (DNS) Encryption

DNS may be understood to be one of the fundamental building blocks of the Internet. It may be understood to be used any time a website is visited, an email is sent, an IM conversation is maintained or anything else is performed online. When a user opens an application, DNS protocol may be used to retrieve the server IP address/es for the target application domain. DNS protocol today is usually unencrypted, DNS over UDP/TCP, but there are different IETF drafts proposing DNS encryption to prevent middleboxes to detect DNS traffic. There are different proposals at IETF such as DNS over HTTP/2 (DoH), DNS over TLS (DOT), DNS over QUIC, DNSSEC, DNSCrypt, Quad9, etc. It is foreseen that in the 5G timeframe, that is, the 2020-2030 decade, most DNS traffic will be encrypted.

Fraud in Mobile Networks

Most MNOs charge their subscribers based on tariffs with different pricing based on monthly volume quota, e.g., 10 Gigabyte (GB) per month. There are a lot of fraud techniques today which allow subscribers to avoid deducting volume from their, e.g., monthly, quota. The most important fraud technique is known as Fraud Proxy. A malicious application, e.g., browser, may construct HTTP queries to an operator's free Uniform Resource Locator (URL), added as front query, but with a chargeable destination IP. The external malicious proxy may then route the request to the target server, and route back the traffic to the user, which may access it for free.

Such fraudulent traffic may hinder the performance of load balancing in a communications network and lead to traffic overload situations, thereby negatively affecting the performance of the communications network.

SUMMARY

As part of the development of embodiments herein, one or more challenges with the existing technology will first be identified and discussed.

Network operators today may apply different traffic management actions, one of them being charging the end user, that is, the subscriber, e.g. based on traffic volume on a per application basis. There are applications which may be zero rated or sponsored, e.g., Facebook Zero. Other applications may be prioritized in terms of QoS. There are many applications which try to mimic one of the well-known applications which may be subject to zero rating/sponsoring or prioritized QoS, resulting in fraud. Because most applications today are encrypted, e.g., with HTTPS/TLS or QUIC, including SNI encryption, for those, application detection, and fraud detection/prevention, is more difficult. In addition, DNS traffic may be encrypted, e.g. DoH or DoT, so it is not possible to support fraud detection/prevention based on DNS inspection at a UPF.

As explained above, such fraudulent activity may negatively affect the performance of the communications network. Therefore, it is an object of embodiments herein to improve the handling of traffic in a communications system. Particularly, it is an object of embodiments herein to verify a second node as a server for an application in a communications system. According to a first aspect of embodiments herein, the object is achieved by a computer-implemented method, performed by a first node. The method is for verifying a second node as a server for an application. The first node operates in a communications system. The first node obtains, from a third node operating in the communications system, a first request. The first request is to verify a first Internet Protocol (IP) address for a first domain for the application. The first request indicates the first domain and the first IP address. The first node then sends a first connection request to the second node using the first IP address. The first connection request comprises the first domain indicated in the first request. The first node then receives, in response to the sent first connection request, an indication from the second node. The indication comprises a certificate of the second node. The first node then validates and authenticates the certificate as corresponding to the first domain. The first node then sends a message to the third node based on a result of the validation and authentication.

According to a second aspect of embodiments herein, the object is achieved by a computer-implemented method, performed by the second node. The method is for verifying the second node as the server for the application. The second node operates in the communications system. The second node receives the first connection request from the first node operating in the communications system. The first connection request comprises the first domain. The second node then sends, in response to the received first connection request, the indication to the first node. The indication comprises the certificate of the second node. The method is performed in the absence of a subsequent request for application content application content from the first node due to an inability of the first node to request such content.

According to a third aspect of embodiments herein, the object is achieved by a computer-implemented method, performed by the third node. The method is for verifying the second node as the server for the application. The third node operates in the communications system. The third node receives, from a first device operating in the communications system, a second connection request towards the second node. The second connection request comprises the first IP address corresponding to the second node, and the first domain for the application. The third node also sends, to the first node operating in the communications system, the first request to verify the first IP address for the first domain for the application. The first node is different than the second node. The third node receives, in response to the sent first request, the message from the first node. The message indicates whether or not the second node corresponding to the first IP address is the authentic owner of the first domain for the application.

According to a fourth aspect of embodiments herein, the object is achieved by a computer-implemented method, performed by a communications system. The method is for verifying the second node as the server for the application. The communications system comprises at least the first node, the second node and the third node. The method comprises receiving, by the third node, from the first device operating in the communications system, the second connection request towards the second node. The second connection request comprises the first IP address corresponding to the second node, and the first domain for the application. The method also comprises sending, by the third node, to the first node, the first request to verify the first IP address for the first domain for the application. The first node is different than the second node. The method then comprises obtaining, by the first node, the first request from the third node. The method also comprises sending, by the first node, the first connection request comprising the first domain indicated in the first request. The method also comprises receiving, by the second node, the first connection request from the first node. The method additionally comprises sending, by the second node, in response to the received first connection request, the indication to the first node. The indication comprises the certificate of the second node. The method is performed in the absence of a subsequent request for application content from the first node due to the inability of the first node to request such content. The method also comprises receiving, by the first node, in response to the sent first connection request, the indication from the second node. The method further comprises validating and authenticating, by the first node, the certificate as corresponding to the first domain. The method then comprises sending, by the first node, the message to the third node based on the result of the validation and authentication. The method also comprises receiving, by the third node, in response to the sent first request, the message from the first node. The message indicates whether or not the second node corresponding to the first IP address is the authentic owner of the first domain for the application.

According to a fifth aspect of embodiments herein, the object is achieved by the first node, for verifying the second node as the server for the application. The first node is configured to operate in the communications system. The first node is further configured to obtain, from the third node configured to operate in the communications system, the first request to verify the first IP address for the first domain for the application. The first request is configured to indicate the first domain and the first IP address. The first node is also configured to send the first connection request to the second node using the first IP address. The first connection request is configured to comprise the first domain configured to be indicated in the first request. The first node is further configured to receive, in response to the first connection request configured to be sent, the indication from the second node. The indication is configured to comprise the certificate of the second node. The first node is additionally configured to validate and authenticate the certificate as corresponding to the first domain. The first node is further configured to send the message to the third node based on the result of the validation and authentication.

According to a sixth aspect of embodiments herein, the object is achieved by the second node, for verifying the second node as the server for the application. The second node is configured to operate in the communications system. The second node is further configured to receive the first connection request from the first node configured to operate in the communications system. The first connection request is configured to comprise the first domain. The second node is also configured to send, in response to the first connection request configured to be received, the indication to the first node. The indication is configured to comprise the certificate of the second node. The second node is configured to perform these actions in the absence of subsequent request for application content from the first node due to the inability of the first node to request such content.

According to a seventh aspect of embodiments herein, the object is achieved by the third node, for verifying the second node as the server for the application. The third node is configured to operate in the communications system. The third node is further configured to receive, from the first device configured to operate in the communications system, the second connection request towards the second node. The second connection request is configured to comprise the first IP address corresponding to the second node, and the first domain for the application. The third node is also configured to send, to the first node configured to operate in the communications system, the first request to verify the first IP address for the first domain for the application. The first node is configured to be different than the second node. The third node is further configured to receive, in response to the sent first request, the message from the first node. The message is configured to indicate whether or not the second node corresponding to the first IP address is the authentic owner of the first domain for the application.

According to an eighth aspect of embodiments herein, the object is achieved by the communications system, for verifying the second node as the server for the application. The communications system comprises the first node, the second node and the third node. The communications system is further configured to receive, by the third node, from the first device configured to operate in the communications system, the second connection request towards the second node. The second connection request is configured to comprise the first IP address corresponding to the second node, and the first domain for the application. The communications system is also configured to send, by the third node 113, to the first node, the first request to verify the first IP address for the first domain for the application. The first node is configured to be different than the second node. The communications system is further configured to obtain, by the first node, the first request from the third node. The communications system is additionally configured to send, by the first node, the first connection request to the second node using the first IP address. The first connection request is configured to comprise the first domain configured to be indicated in the first request. The communications system is also configured to receive, by the second node, the first connection request from the first node. The second node is also configured to send, by the second node, in response to the first connection request configured to be received, the indication to the first node. The indication is configured to comprise the certificate of the second node. The communications system is configured to perform these actions in the absence of a subsequent request for application content from the first node due to the inability of the first node to request such content. The communications system is also configured to receive, by the first node, in response to the first connection request configured to be sent, the indication from the second node. The communications system is additionally configured to validate and authenticate, by the first node, the certificate as corresponding to the first domain. The communications system is further configured to send, by the first node, the message to the third node based on the result of the validation and authentication. The communications system is further configured to receive, by the third node, in response to the first request configured to be sent, the message from the first node. The message is configured to indicate whether or not the second node corresponding to the IP address is the authentic owner of the first domain for the application.

By obtaining the first request to verify the first IP address for the first domain for the application from the third node, the first node may be enabled to trigger a verification of the first IP address for the first domain for the application. By sending the first connection request, the first node may enable the verification of the first IP address for the first domain for the application. The first node may thereby be enabled to act as a client and may then be able to see in clear text the information that the second node, e.g., the application server, may send. The domain name parameter may be understood to only be present in clear text in the client messages. The first node may be understood to need to not believe that the first device may have provided the real domain name, in e.g., a fraud scenario. The only way of verifying the identity of the second node, e.g., the application server, may be understood to be by the first node opening a connection replicating, e.g., a Client Hello message. This may be referred to herein as a lateral connection or lateral discovery. By validating and authenticating the certificate as corresponding to the first domain, the first node may be able to verify, through the authentication process, whether or not the second node behind the IP address may have the first domain. By performing this lateral discovery, and being enabled to ultimately notify a responsible node to take action to manage the fraud, the first node may thereby enable to avoid fraud and other types of attacks such as phishing and intrusion. By sending the message to the third node, the first node may enable the third node to take appropriate action, such as e.g., to trigger an alarm, e.g., a Fault Management (FM) alarm, such as for phishing detection, intrusion detection or classification of encrypted traffic, user notification of a potential phishing/intrusion attack, logging or even notifying the end user that the certificate is not valid, to increase a counter/statistic record, e.g., Performance Management (PM) record, for non-valid certificates, etc., This may in turn enable the third node to take action with respect to traffic that may be directed to the second node if fraudulent, which may in turn enable to use resources of the communications system, and of the first device, for fraudulent traffic, which may enable a more effective use of load, computing resources and energy resources, as well as latency of the communications system. Furthermore, the first node may enable the third node to trigger the application of the appropriate policies to the traffic to the second node.

The first node may further enable to avoid having to rely on, that is trust, that the client may have always authenticated the second node, e.g., within a fraud context.

BRIEF DESCRIPTION OF THE DRAWINGS

Examples of embodiments herein are described in more detail with reference to the accompanying drawings, according to the following description.

DETAILED DESCRIPTION

Embodiments herein may be understood to relate to a mechanism which may be understood to solve the problems with the existing methods described in the Summary section and may be based on TLS lateral server name discovery and lateral server authentication. Embodiments herein may be used for fraud prevention, by detecting fraudulent traffic and applying the corresponding actions, and also for phishing and intrusion prevention.

Particular embodiments herein may be understood to relate to TLS Lateral Server Name Discovery and Server Authentication. Further particular embodiments herein may provide a mechanism based on TLS lateral server name discovery and lateral server authentication, which may allow the network operator to prevent fraud, phishing and intrusion.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments. All possible combinations are not described to simplify the description.

Figure 1:
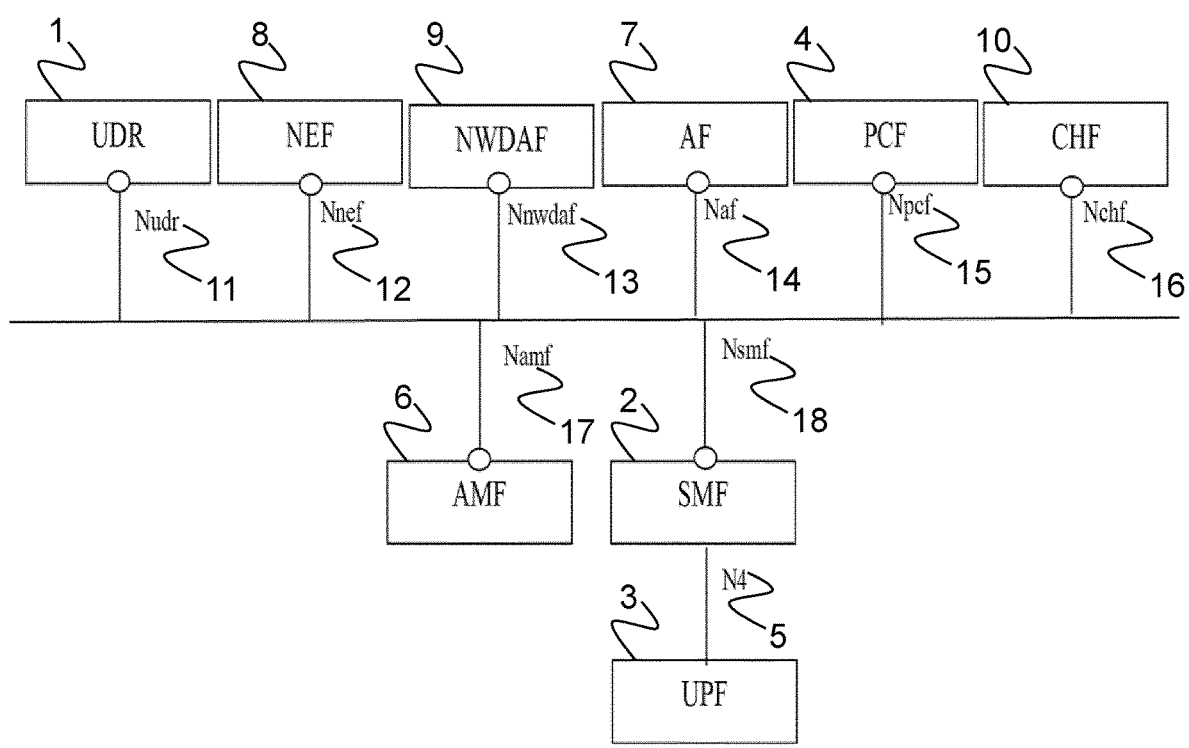
FIG. 1 is a schematic diagram illustrating a non-limiting example of a 5G Network Architecture.
Figure 2:
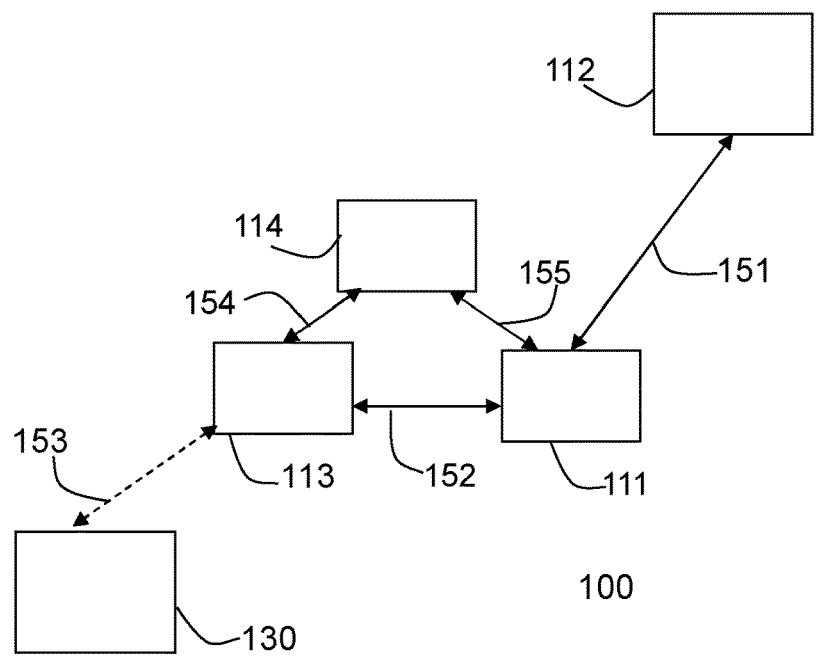
FIG. 2 is a schematic diagram illustrating a non-limiting example of a communications system, according to embodiments herein.
Figure 2:
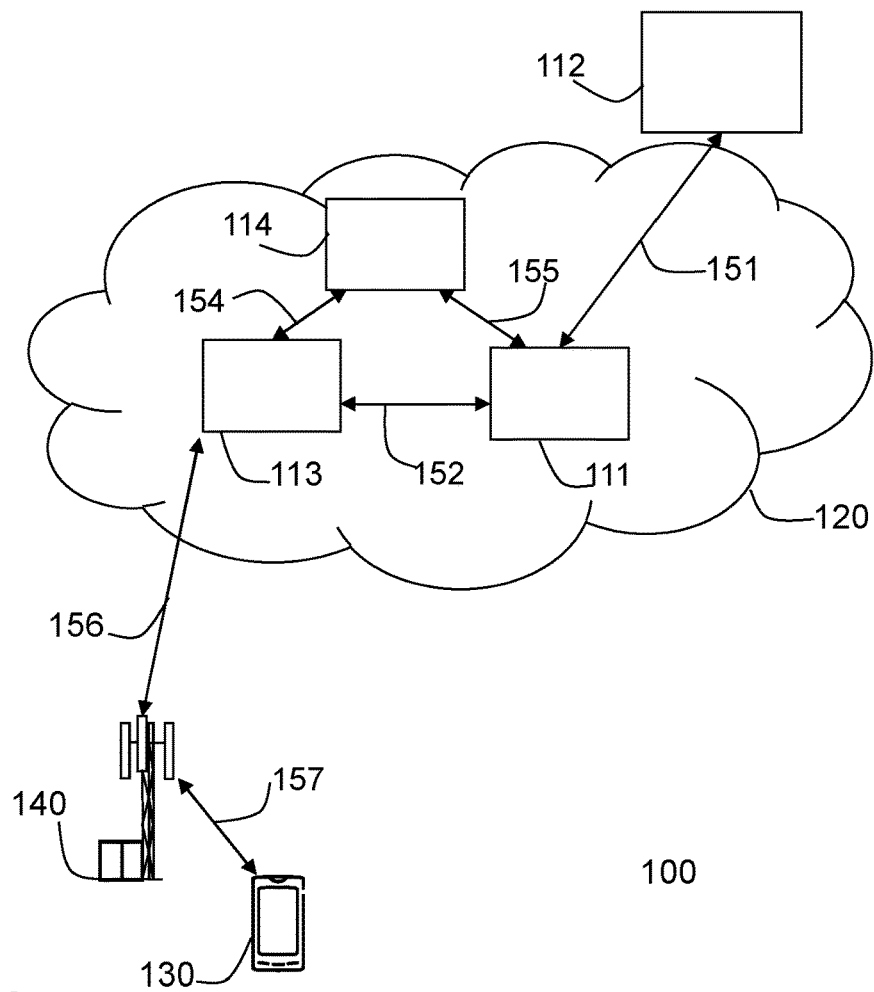

FIG. 2 depicts two non-limiting examples, in panels "a" and "b", respectively, of a communications system 100, in which embodiments herein may be implemented. In some example implementations, such as that depicted in the non-limiting example of FIG. 2a, the communications system 100 may be a computer network. In other example implementations, such as that depicted in the non-limiting example of FIG. 2b, the communications system 100 may be implemented in a telecommunications system, sometimes also referred to as a telecommunications network, cellular radio system, cellular network or wireless communications system. In some examples, the telecommunications system may comprise network nodes which may serve receiving nodes, such as wireless devices, with serving beams.

In some examples, the telecommunications system may for example be a network such as 5G system, or a newer system supporting similar functionality. The telecommunications system may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broa (DMand (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications system may for example support a Low Power Wide Area Network (LPWAN). LPWAN technologies may comprise Long Range physical layer protocol (LoRa), Haystack, SigFox, LTE-M, and Narrow-Band IoT (NB-IoT).

Although terminology from Long Term Evolution (LTE)/5G has been used in this disclosure to exemplify the embodiments herein, this should not be seen as limiting the scope of the embodiments herein to only the aforementioned system. Other wireless systems support similar or equivalent functionality may also benefit from exploiting the ideas covered within this disclosure. In future telecommunication networks, e.g., in the sixth generation (6G), the terms used herein may need to be reinterpreted in view of possible terminology changes in future technologies.

The communications system 100 may comprise a plurality of nodes, and/or operate in communication with other nodes. In FIG. 2, panel a) depicts a first node 111, a second node 112, a third node 113, and a fourth node 114, which are all comprised in the communications system 100. Any of the first node 111, the second node 112, the third node 113 and the fourth node 114 may be understood, respectively, as a first computer system, a second computer system, a third computer system and a fourth computer system. In some examples, any of the first node 111, the second node 112, the third node 113 and the fourth node 114 may be implemented as a standalone server in e.g., a host computer in the cloud 120, as depicted in the non-limiting example depicted in panel b) of FIG. 2. Any of the first node 111, the second node 112, the third node 113 and the fourth node 114 may in some examples be a distributed node or distributed server, with some of their respective functions being implemented locally, e.g., by a client manager, and some of its functions implemented in the cloud 120, by e.g., a server manager. Yet in other examples, any of the first node 111, the second node 112, the third node 113 and the fourth node 114 may also be implemented as processing resources in a server farm.

In some embodiments, any of the first node 111, the second node 112, the third node 113 and the fourth node 114 may be independent and separated nodes. In other embodiments, any of the first node 111, the third node 113 and the fourth node 114 may be co-located or be the same node. All the possible combinations are not depicted in FIG. 2 to simplify the Figure.

It may be understood that the communications system 100 may comprise more nodes than those represented on panel a) of FIG. 2.

In some examples of embodiments herein, the first node 111 may be understood as a node, e.g., an AF, having a capability to perform security functions, such as authentication and verification. In some examples herein, the first node 111 may be referred to as a Server Authentication Function (SAF). The first node 111 may be understood as a node lacking an ability to request application content from an application content provider such as the second node 112, e.g., an Application Server (AS). The first node 111 may be, in some examples, a core network node. In some examples, the first node 111 may be managed by a different party than the second node 112, the third node 113 and the fourth node 114.

The second node 112 may be a node operating outside a core network of the communications system 100. The second node 112 may be understood to have a capability to allow external parties to use the Exposure Application Program Interfaces (APIs) offered by the network operator of the communications system 100, such as an AF in 5G, a Service Capability Server/Application Server (SCS/AS) in 4G, or a node or database capable of providing application content or performing a similar function in the communications system 100.

The third node 113 may be a node having a capability to support handling of user plane traffic, such as packet inspection and different enforcement actions, e.g., reporting for charging and QoS handling. In some particular examples, the third node 113 may be a UPF, e.g., in a 5G network.

The fourth node 114 may be a node having a capability to store data relating to subscribers or users of the communications system 100. The fourth node 114 may have a capability to store data grouped into distinct collections of subscription-related information: subscription data, policy data, structured data for exposure, and application data. In some particular examples, the fourth node 114 may be a UDR, e.g., in a 5G network, a Subscriber Profile Repository (SPR) in 4G, a subscriber policy database, or a node capable of performing an equivalent function.

The communications system 100 may comprise a plurality of devices whereof a first device 130 is depicted in FIG. 2. The first device 130 may be also known as e.g., user equipment (UE), a wireless device, mobile terminal, wireless terminal and/or mobile station, mobile telephone, cellular telephone, or laptop with wireless capability, or a Customer Premises Equipment (CPE), just to mention some further examples. The first device 130 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications system 100. The first device 130 may be wireless, i.e., it may be enabled to communicate wirelessly in the communications system 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications system 100.

The communications system 100 may comprise one or more radio network nodes, whereof a radio network node 140 is depicted in FIG. 2*b*. The radio network node 140 may typically be a base station or Transmission Point (TP), or any other network unit capable to serve a wireless device or a machine type node in the communications system 100. The radio network node 140 may be e.g., a 5G gNB, a 4G eNB, or a radio network node in an alternative 5G radio access technology, e.g., fixed or WiFi. The radio network node 140 may be e.g., a Wide Area Base Station, Medium Range Base Station, Local Area Base Station and Home Base Station, based on transmission power and thereby also coverage size. The radio network node 140 may be a stationary relay node or a mobile relay node. The radio network node 140 may support one or several communication technologies, and its name may depend on the technology and terminology used. The radio network node 140 may be directly connected to one or more networks and/or one or more core networks.

The communications system 100 covers a geographical area which may be divided into cell areas, wherein each cell area may be served by a radio network node, although, one radio network node may serve one or several cells.

The first node 111 may communicate with the second node 112 over a first link 151, e.g., a radio link or a wired link. The first node 111 may communicate with the third node 113 over a second link 152, e.g., a radio link or a wired link. The third node 113 may communicate, directly or indirectly, with the first device 130 over a third link 153, e.g., a radio link or a wired link. The second node 112 may communicate, directly or indirectly with the fourth node 114 over a fourth link 154, e.g., a radio link or a wired link. The first node 111 may communicate with the fourth node 114 over a fifth link 155, e.g., a radio link or a wired link. The third node 113 may communicate, directly or indirectly with the radio network node 140 over a sixth link 156, e.g., a radio link or a wired link. The radio network node 140 may communicate with the first device 130 over a seventh link 157, e.g., a radio link. Any of the first link 151, the second link 152, the third link 153, the fourth link 154, the fifth link 155, the sixth link 156, and/or the seventh link 157, may be a direct link or it may go via one or more computer systems or one or more core networks in the communications system 100, or it may go via an optional intermediate network. The intermediate network may be one of, or a combination of more than one of, a public, private or hosted network; the intermediate network, if any, may be a backbone network or the Internet, which is not shown in FIG. 2.

In general, the usage of "first", "second", "third", "fourth", "fifth", "sixth" and/or "seventh" herein may be understood to be an arbitrary way to denote different elements or entities, and may be understood to not confer a cumulative or chronological character to the nouns these adjectives modify.

Embodiments of a computer-implemented method, performed by the first node 111, will now be described with reference to the flowchart depicted in FIG. 3. The method may be understood to be for verifying the second node 112 as a server for an application. The first node 111 operates in the communications system 100.

In some embodiments, the first node 111 may be an AF, referred to herein as a SAF.

The method may comprise the actions described below. In some embodiments all the actions may be performed. In some embodiments some of the actions may be performed. In FIG. 3, optional actions are indicated with a dashed box. One or more embodiments may be combined, where applicable. All possible combinations are not described to simplify the description. It should be noted that the examples herein are not mutually exclusive. Components from one example or embodiment may be tacitly assumed to be present in another example or embodiment and it will be obvious to a person skilled in the art how those components may be used in the other examples or embodiments.

Figure 3:
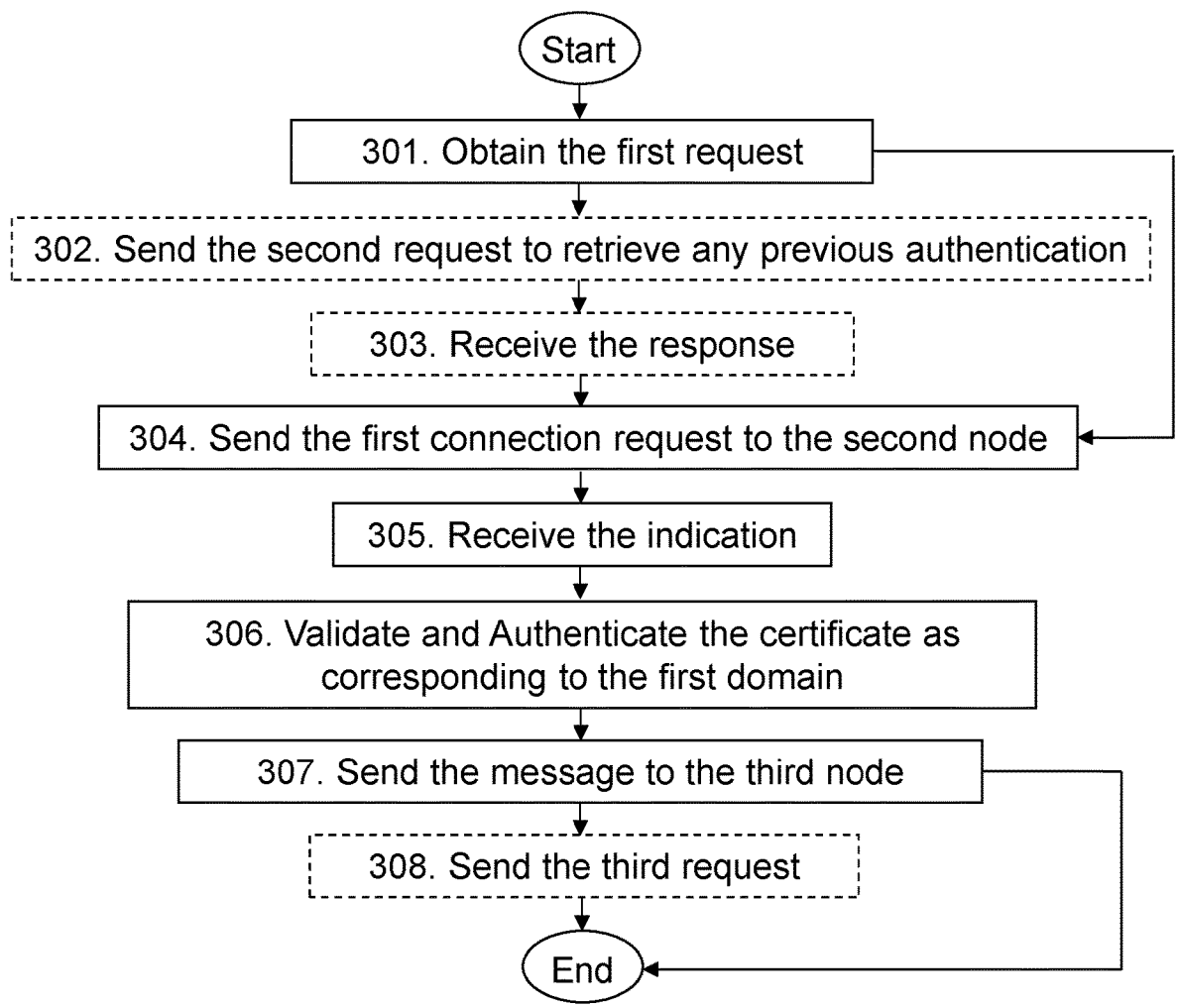
FIG. 3 is a flowchart depicting embodiments of a method in a first node, according to embodiments herein.

In FIG. 3, optional actions are represented with dashed boxes.

Action 301

During the course of operations of the communications system 100, a user of the communications system 100, via the first device 130 may have a Protocol Data Unit (PDU) session may be established in the communications system 100. The first device 130 may open an application, such as example.com. In doing so, the first device 130 may initiate a handshake procedure with the second node 112, which may be presumed to be a node capable of providing content for a certain application having a domain, such as e.g., example.com. That is, the second node 112 may be presumed to be an application server for example.com. In doing so, the first device 130 may send a connection request towards the second node 112. The second connection request may comprise a first Internet Protocol (IP) address corresponding to the second node 112, and a first domain for the application. The connection request may go via the core network node of the communications system 100 and be detected by the third node 113 which may then, according to embodiments herein, ask the first node 111 to check that the first IP address indicated in the connection request indeed corresponds to the first domain for the application. In other words, to check that the node behind the first IP address is a real provider of application content for the indicated first domain, and that the connection is not being misdirected to a content provider of another application, that content provider fraudulently impersonating the real content provider for the indicated application.

According to the foregoing, in this Action 301, the first node 111 obtains, from the third node 113 operating in the communications system 100, a first request. The first request is to verify the first Internet IP address for the first domain for the application. The first request indicates the first domain and the first IP address.

The obtaining of the first request may be performed by receiving the first request e.g., via the second link 152.

To verify may be understood to comprise to authenticate.

In some embodiments, the first domain may be a Server Name Indication (SNI).

The first request may be a Nsaf_Authentication Request.

In typical embodiments, the first node 111 and the third node 113 may be different nodes. In some embodiments, the second node 112 may be one of an Application Server and another node, and at least one of the following two options may apply with respect to the first node 111 and the third node 113. According to a first option wherein the communications system 100 may be a 5G network, the first node 111 may be a first network function, and the third node 113 may be a User Plane Function (UPF). The first node 111 may be referred to herein as a Security Application Function (SAF), given the security functionality it performs. A second option wherein the communications system 100 may be a 5G network will be described later. According to a third option the communications system 100 may be a 4G network. In some of such embodiments, the first node 111 may be a first network node and the third node 113 may be one of a Packet Data Network Gateway User Plane Function (PGW-U), and a Traffic Detection Function User Plane Function (TDF-U).

Alternatively, the first node 111 and the third node 113 may be at least one of: co-localized and the same node. For example, the first node 111 may be a SAF which may be a (micro) service running in a UPF.

By obtaining the first request to verify the first IP address for the first domain for the application in this Action 301, the first node 111 may be enabled to trigger a verification of the first IP address for the first domain for the application in Actions 302-305. The first node 111 may thereby enable to avoid fraud and other types of attacks such as phishing and intrusion by being enabled to ultimately notify a responsible node to take action to manage the fraud, as described later for the third node 113. The first node 111 may further enable to avoid having to rely on, that is trust, that the client may have always authenticated the second node 112, e.g., within a fraud context.

Action 302

In order to verify the second node 112 as the server for the application, here example.com, the first node 111 may, in some embodiments, first check if the received first IP address may have been already authenticated for the first domain. In some embodiments, the first node 111 may have a local cache for previously authenticated servers, and it may consult the local cache.

In some embodiments, the first node 111 may lack such a cache, or the cache may either be empty or the required entry may not be found. In such embodiments, the first node 111 may consult if such information may be stored elsewhere. In this Action 302, the first node 111 may send a second request to a fourth node 114 operating in the communications system 100. The first node 111 may thereby request the fourth node 114 to retrieve any previous authentication of the received first IP address.

The sending of the second request may be performed e.g., via the fifth link 155.

The second request may include the following parameters: the first IP address, e.g., a Server IP, which may be understood to identify the IP address of the Application Server to be authenticated, and the first domain, e.g., the SNI, which may be understood to identify the domain for which the Application Server is to be authenticated.

The fourth node 114 may be, in some embodiments, e.g., wherein the communications system 100 may be a 5G network, a UDR. In some of such embodiments, the second request may be a Nudr_Get Request message. In examples wherein the communications system 100 may be a 4G network, the fourth node 114 may be an SPR.

The fourth node 114 may store a common database with all the MNO Authenticated nodes, e.g., servers, and the corresponding Authenticated domains, either as SNIs or CNs. The fourth node 114 may have generated a common database based on information generated by the different first nodes 111 and third nodes 113 in the communications system 100.

By sending the second request in this Action 302, the first node 111 may enable to simplify the verification process, and thereby save time, processing, signalling and energy resources in the communications system 100, in the event that the verification may have already been performed previously for the second node 112.

Action 303

The fourth node 114 may look in its database, e.g., a database for trusted/authenticated servers for a Mobile Network Operator (MNO) of the communications system 100, for the indicated first IP address. If present, the fourth node 114 may look for an associated domain to that first IP address.

In this Action 303, the first node 111 may receive a response from the fourth node 114. The response may indicate whether or not the fourth node 114 was able to retrieve any previous authentication of the received first IP address.

The receiving of the response may be performed e.g., via the fifth link 155.

In some examples wherein the fourth node 114 may be a UDR, the response received in this Action 303 may be a Nudr_Get Response message.

In some examples, the fourth node 114 may not have found the first IP address in the trusted/authenticated server database, so the fourth node 114 may answer the first node 111 with the response indicating that the fourth node 114 was unable to retrieve any stored domain corresponding to the received first IP address, e.g., indicating that the first IP address was not found. In other examples, the fourth node 114 may answer the first node 111 with the response indicating that a previous authentication did not indicate the received first IP address is invalid for the first domain.

By receiving the response from the fourth node 114 in this Action 304, the first node 111 may enable to simplify the verification process, and thereby save time, processing, signalling and energy resources in the communications system 100, in the event that the verification may have already been performed previously for the second node 112.

Action 304

If the first node 111 was unable to retrieve a previous authentication of the first IP address, the first node 111 may then attempt to verify the first IP address itself. In networks protocols, the responsibility of authentication may reside in the endpoints. Therefore, the only way to authenticate the second node 112 may be by the first node 111 becoming an endpoint.

Accordingly, in this Action 304, the first node 111 sends a first connection request to the second node 112. The sending in this Action 304 is performed using the first IP address. The first connection request comprises the first domain indicated in the first request.

The sending of the first connection request may be performed e.g., via the first link 151.

The first node 111 may be understood to, by performing this Action 304, trigger a connection, e.g., by sending a TCP connection, towards the second node 112 and then trigger a TCP handshake, by replicating the TLS handshake of the first device 130, e.g., by replicating the TLS Client Hello message that the first device 130 may have originally sent, including the first domain, e.g., the detected SNI. For simplicity, this is referred to herein as part of the same Action 304. To express the foregoing in other words, the first node 111 may attempt to verify the first IP address itself by impersonating the first device 130.

The sending of Action 302 and the receiving of Action 303, if performed, may be understood to be performed prior to sending 304 the first connection request.

The sending in this Action 304 of the first connection request may be based on the received response in Action 303. In some embodiments, the sending 304 of the first connection request is performed with the proviso that one of: a) the fourth node 114 was unable to retrieve any stored domain corresponding to the received first IP address, and b) a previous authentication did not indicate the received first IP address is invalid for the first domain.

In some embodiments, the first connection request may be a Transport Layer Security (TLS) Client Hello message.

By sending the first connection request in this Action 304, the first node 111 may enable the verification of the first IP address for the first domain for the application in Action 305. The first node 111 may thereby be enabled to act as a client and may then be able to see in clear text the information that the second node 112, e.g., the application server, may send. The domain name parameter may be understood to only be present in clear text in the client messages. The first node 111 may be understood to need to not believe that the first device 130 may have provided the real domain name in e.g., a fraud scenario. The only way of verifying the identity of the second node 112, e.g., the application server, may be understood to be by the first node 111 opening a connection replicating the Client Hello message. This is referred to herein as a lateral connection or lateral discovery. By performing this lateral discovery, the first node 111 may thereby enable to avoid fraud and other types of attacks such as phishing and intrusion by being enabled to ultimately notify a responsible node to take action to manage the fraud, as described later for the third node 113. The first node 111 may further enable to avoid having to rely on, that is trust, that the client may have always authenticated the second node 112, e.g., within a fraud context.

Action 305

In this Action 305, the first node 111, receives, in response to the sent first connection request, an indication from the second node 112. The indication comprises a certificate of the second node 112. In other words, in response to Action 304, the second node 112 may in this Action 305, complete the TLS handshake.

In some embodiments, the certificate may comprise a Common Name.

In some embodiments, the indication may be a TLS Certificate message comprising the Common Name and the certificate corresponding to the second node 112.

The TLS handshake may include the TLS Server Hello and the TLS Server Certificate, which may include the certificate and the Common Name for the second node 112. For simplicity, this is referred to herein as part of the same Action 305.

The receiving of the indication may be performed e.g., via the first link 151.

Action 306

In this Action 306, the first node 111, validates and authenticates the certificate as corresponding to the first domain.

The first node 111 may validate and authenticate the certificate as corresponding to the first domain by performing the following checks.

First, the first node 111 may Confirm that the first domain, e.g., the SNI in TLS Client Hello message, and the Common Name, as comprised in the TLS Server Certificate message, match. That is, whether they are equal or, in case of wildcard certificates, there is a match, For example, the first node 111 may check if SNI=www.example.com and CN=*.example.com, where CN corresponds to a wildcard certificate which may apply to different subdomains.

Second, the first node 111 may also verify, that is, check, that the second node 112 has a valid certificate e.g., by checking against a list of trusted Certificate Authorities (CAs). Validating the certificate may be understood to comprise to check that the certificate has been emitted by a trusted CA and it may be understood to be needed to check the integrity of the certificate using the signature of the certificate received. For this, the first node 111 may have to keep a list of trusted CAs. The first node 111 may have to do a hash of the certificate received and check that is the same that the signature, wherein the signature may be understood as the encrypted hash, decrypted received, using the public key of the CA for decrypting. When the certificate is emitted by the CA, the CA may do a hash of the certificate and encrypt the hash with its private key, which may be understood as signing. When a certificate is received first node 111 may have to do the hash and decrypt the signature to check the integrity. If the hash does not match with the decrypted signature, it may be understood to mean that the certificate has been modified. In this case, the first node 111 may determine that the certificate is not to be trusted.

Validating the certificate may also comprise to check that the certificate has not expired or has not been revoked.

Third, the first node 111 may need to check that the received certificate is valid and for the specific domain requested, that is, for the first domain. That is, for example, to check that the SNI==CN. It may be noted that the received certificate may be a valid certificate for a specific domain from any entity, but this may be understood to not necessarily mean that the first domain corresponds to the intended domain. Therefore, when the certificate is received, the first node 111 may need to check that who send the certificate is who it claims to be. This is known as the authentication of the certificate, e.g., in the CN. In order to do this, the first node 111 may need to confirm that the second node 112, e.g., the server, has the private key associated to the public key in the received certificate. It may be noted that in TLS 1.3, the Server Certificate message may be encrypted. In some embodiments, the validating and authenticating the certificate in this Action 306 may further comprise decrypting the certificate. The first node 111 may now, having sent the first connection request and acting as client, be enabled to decrypt the certificate and to verify the first domain, e.g., the SNI, and the CN match, since as a part of the handshake performed with the second node 112, it may have received a private key.

The full handshake may need to end without errors or alerts, which may then be understood to mean that the second node 112 may have the private key and that the second node 112 may be considered to be who it says to be.

By the first node 111 verifying that the certificate corresponds to the first domain, the first node 111 may be understood to verify that the certificate is valid. However, the first node 111 may be understood to further need to ensure that the identity of the second node 112 is the first domain, that is, the domain name, in other words, the first node 111 may need to also verify that the second node 112 has the private key associated to the public key given in the certificate. A TLS handshake, for example, may be understood to perform this, validate a certificate plus verifying that e.g., a server is the owner of the private key. The authentication process that may be performed by the first node 111 in this Action 306 may be understood to comprise, in some examples, to complete a full TLS handshake with the second node 112, e.g., an application server. By validating and authenticating the certificate as corresponding to the first domain in this Action 306, the first node 111 may be able to verify, through the authentication process, whether or not the second node 112 behind the IP address may have the first domain. This may in turn enable the first node 111 to avoid fraud and other types of attacks such as phishing and intrusion. In some examples, this may be since in TLS, the client may be understood to be responsible of authenticating a server. However, the first node 111 may enable to avoid having to rely on, that is trust, that the client may have always authenticated the second node 112, e.g., within a fraud context.

Action 307

In this Action 307, the first node 111, sends a message to the third node 113 based on a result of the validation and authentication performed in Action 306.

In some embodiments, the message may be a Nsaf_Authentication Response message.

For example, if the checks performed in Action 306 are successful, the first node 111 may trigger towards the third node 113 the message, e.g., a Nsaf_Authentication Response message, indicating successful operation, for example by indicating "Authentication=OK". Otherwise, if the checks performed in Action 306 are unsuccessful, the first node 111 may trigger towards the third node 113 the message, e.g., the Nsaf_Authentication Response message, indicating unsuccessful operation, for example by indicating "Authentication=NOK". The message may further comprise other information regarding the authentication, e.g., AuthenticationInfo, which may indicate which of the checks in Action 306 may have failed.

If the first domain corresponds to the CN, e.g., SNI==CN, the message to the third node 113, e.g., the authentication response to the UPF, may be "OK", and if they mismatch the message to the third node 113, e.g., the authentication response, may be "NO-OK". However, in both cases the first node 111 may decide to store the CN to first IP address relationship in the Action 308.

The sending of the message may be performed e.g., via the first link 152.

By sending the message to the third node 113 in this Action 307, the first node 111 may enable the third node 113 to take appropriate action, such as e.g., to trigger an alarm, e.g., a Fault Management (FM) alarm, such as for phishing detection, intrusion detection or classification of encrypted traffic, user notification of a potential phishing/intrusion attack, logging or even notifying the end user that the certificate is not valid, to increase a counter/statistic record, e.g., Performance Management (PM) record, for non-valid certificates, etc. This may in turn enable the third node 113 to take action with respect to traffic that may be directed to the second node 112 if fraudulent, which may in turn enable to use resources of the communications system 100, and of the first device 130, for fraudulent traffic, which may enable a more effective use of load, computing resources and energy resources, as well as latency of the communications system 100. Furthermore, the first node 111 may enable the third node 113 to trigger the application of the appropriate policies to the traffic to the second node 112.

Action 308

In this Action 308, the first node 111 may, after validating and authenticating 306 the certificate as corresponding to the first domain, send a third request to the fourth node 114 to store a further indication. The further indication may indicate the result of the validation and authentication.

If the authentication is correct, the first node 111 may request the fourth node 114 to store the first IP address to first domain relationship in for example, an authenticated servers database. If the authentication is not correct, the first node 111 may store that the first IP address to first domain relationship is not valid, that is, not true, in for example, a non-authenticated server database. Alternatively, the first node 111 may refrain from taking further action with respect to storing.

In some examples, the first node 111 may request the fourth node 114 to store the CN of the received certificate in the database.

The sending in this Action 308 of the third request may be performed one of: after every performance of the validation and authentication, and periodically. For example, when a reporting threshold, e.g., periodic, may be reached, the first node 111 may trigger towards the third node 113 a request to store the Authenticated Servers and the corresponding SNIs, by triggering the third request, e.g., a Nudr_Store Request message, including the following parameters. A first parameter may be a list of IP addresses and of domains, e.g., a List of (Server IP, List of SNI)). Alternatively, the relationship of the first IP address to the common name (CN), e.g., Server IP: CN relationship, may be stored. For each IP address, e.g., Server IP, every domain, e.g., SNI, may be authenticated. For example, for IP address #X, the third node 113 may detect a TLS Client Hello (CH) with domain #Y1 and, for another user session, for the same IP address #X, UPF the third node 113 may detect a TLS CH with domain #Y2. Hence, the authentication procedure may be triggered, according to embodiments herein, for both domains. This is illustrated with the following example, wherein two cases, Case 1 and Case 2 are contemplated. In each different domains are SNIs associated with different CNs.

EXAMPLE

Case 1:
   SNI    #Y1:    www.example1.com    (CN: www.example1.com)
   SNI    #Y2:    www.example2.com    (CN: www.example2.com)

Case 2:
   SNI #Y1: subdomain1.example.com (CN: *.example.com)
   SNI #Y2: subdomain2.example.com (CN: *.example.com)

In Case 2, there is a wildcard certificate where the CN covers multiple subdomains. Therefore, it may be more efficient to store and/or cache the IP: CN relationship, instead of the IP: SNI relationship. Additionally, only in Case 2, if the first node 111 has already authenticated Server IP #X and SNI #Y1, there may be no need for the first node 111 to authenticate Server IP #X and SNI #Y2.

By sending the message to the fourth node 114 in this Action 308, the first node 111 may enable the fourth node 114 to build a common database, e.g., stored in the fourth node 114 and, based on information generated by the different third nodes 113 in the network, including MNO trusted, that is, authenticated, servers, as IP addresses, and for each trusted, authenticated, server, the, authenticated, domains it may serve, either as SNIs or Common Names. In particular embodiments, the IP: SNI relationship may be stored in the database, e.g., the UDR, and cached in the third node 113 and/or the first node 111. By building such a database the future verification procedure of any other second node 112 may be simplified, as a record may then already exist in the communications network 100 as to whether the second node 112 may be fraudulent or not. Therefore, the time, energy, processing and signalling resources of the communications system 100 may be used more efficiently. Thereby resulting in an improved performance of the communications system 100.

It may be understood that, in some embodiments of the method performed just described, wherein the communications system 100 may be a 5G network, an authentication function, e.g., a SAF, may, instead of performing Action 304 itself, delegate the performance of the validation and authentication of Action 304 to another node run by a third party. That node, may then perform send the first connection request to the second node 112, and after performing the validation and authentication of the certificate as corresponding to the first domain, send the message, back to the core network, e.g., to the SAF, of the communications system 100. That is, in such embodiments, the third node 113 may be a first network function, e.g., the SAF, and the first node 111 may be network node managed by a first party different than a second party managing the third node 113. In such embodiments, the message sent by the first node 111 to the third node 113 may be an OK or Not OK (NOK) type of message, based on whether the authentication was successful or not, respectively. If the first node 111 performs the authentication process, the first node 111 may discover by itself if the domain name behind the first IP address is the first domain or not. If the first node 111 uses a third party, the third party may answer if this domain name behind the first IP address is the first domain or not. In case it is not, the third party may need to answer which is the common name behind the first IP address, if possible.

Figure 4:
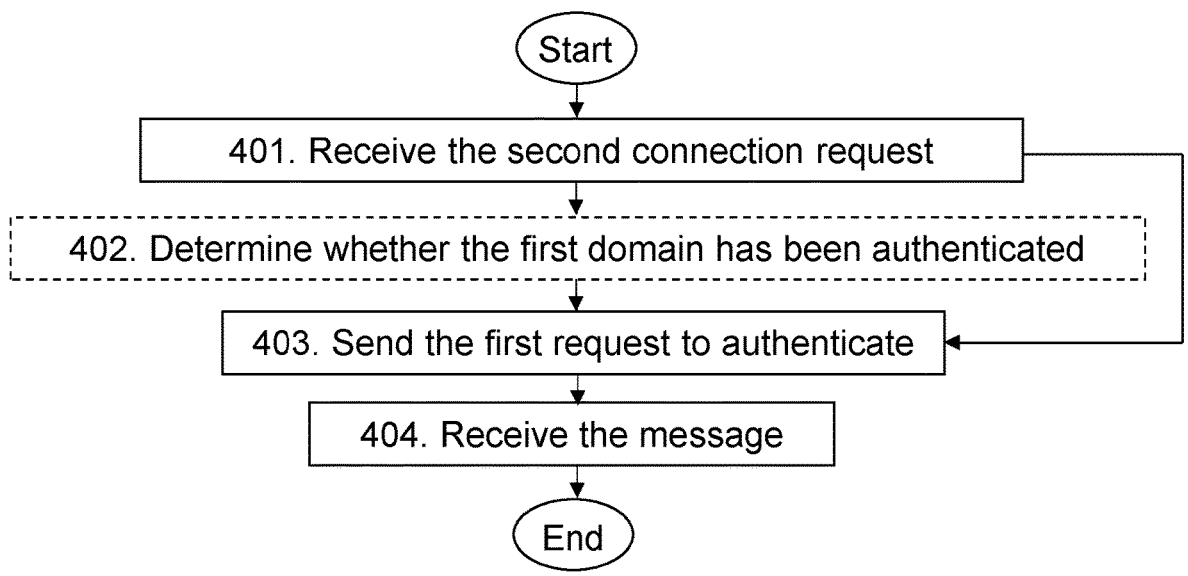
FIG. 4 is a flowchart depicting embodiments of a method in a third node, according to embodiments herein.

Embodiments of a computer-implemented method performed by the third node 113, will now be described with reference to the flowchart depicted in FIG. 4. The method may be understood to be for verifying a second node 112 as the server for the application, e.g., example.com. The third node 113 operates in the communications system 100.

The method may comprise the following actions. Several embodiments are comprised herein. In some embodiments, the method may comprise all actions. In other embodiments, the method may comprise two or more actions. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are depicted with dashed lines.

The detailed description of some of the following corresponds to the same references provided above, in relation to the actions described for the first node 111 and will thus not be repeated here to simplify the description. For example, In typical embodiments, the first node 111 and the third node 113 may be different nodes. In some embodiments, the second node 112 may be one of an Application Server and another node, and at least one of the following two options may apply with respect to the first node 111 and the third node 113.

According to a first option wherein the communications system 100 may be a 5G network, the first node 111 may be a first network function, and the third node 113 may be the UPF. The first node 111 may be referred to herein as the SAF, given the security functionality it performs.

According to the second option wherein the communications system 100 may be a 5G network, the third node 113 may be the first network function, e.g., the SAF, and the first node 111 may be network node managed by the first party different than a second party managing the third node 113.

According to a third option the communications system 100 may be a 4G network. In some of such embodiments, the first node 111 may be the first network node and the third node 113 may be one of a PGW-U, and a TDF-U.

Alternatively, the first node 111 and the third node 113 may be at least one of: co-localized and the same node. For example, the first node 111 may be a SAF which may be a (micro) service running in a UPF.

Action 401

In the course of communications within the communication system 100, a PDU session may already be established for the first device 130. The user of the first device 130 may open an application, e.g., example.com, and send application data towards the second node 112, e.g., an application server having the first IP address, e.g., Server IP #X.

In this Action 401, the third node 113 receives, from the first device 130 operating in the communications system 100, a second connection request. The second connection request is towards the second node 112. The second connection request comprises the first IP address corresponding to the second node 112, and the first domain for the application.

The receiving 401, of the second connection request may be performed e.g., via the third link 153.

In some embodiments, the first domain may be the SNI.

In some embodiments, specifically as part of TLS handshake, the second connection request may be a TLS Client Hello message, triggered by the first device 130 sending application data towards the second node 112. The TLS Client Hello message may comprise the SNI #Y.

In some embodiments, the second connection request may be the TLS Client Hello message. The TLS Client Hello message may include a certain SNI, e.g., SNIs corresponding to sponsored applications, and towards a server IP, at an IP header.

In some examples, the method performed by the third node 113 may be restricted to some preconfigured sponsored domains, e.g., example.com. The third node 113 may then inspect traffic, e.g., TLS traffic, looking for a connection request, e.g., a TLS Client Hello message, including a certain domain, e.g., a certain SNI, e.g., corresponding to sponsored applications, and towards a certain IP address, e.g., a server IP at an IP header.

Action 402

When the third node 113 may detect the second connection request, the third node 113 may retrieve the first IP address, e.g., the server IP and the first domain, e.g., the SNI.

In this Action 402, the third node 113 may determine whether or not the first domain for the application comprised in the received second connection request, has been previously authenticated.

Determining may be understood as e.g., calculating or deciding.

In some examples, the third node 113 may have a local cache for previously authenticated servers. In such examples, the determining in this Action 402 may comprise checking whether the first domain, matches one of the preconfigured domains, e.g., sponsored SNIs.

In some examples, the third node 113 may either have no cache, have its cache empty or, the required entry may not have been found.

Action 403

In this Action 403, the third node 113 may send, to the first node 111 operating in the communications system 100, the first request to verify the first IP address for the first domain for the application. The first node 111 is different than the second node 112.

The first request may be a Nsaf_Authentication Request.

The first request may comprise, the following parameters. First, the first request may comprise the first IP address, e.g., the Server IP, which may be understood to identify the IP address of the second node 112, that is, of the Application Server to be authenticated. Second, the first request may comprise the first domain, e.g., the SNI, which may be understood to identify the domain for which the second node 112, that is, the Application Server may have to be authenticated.

The sending of the first connection request in this Action 403 may be performed e.g., via the second link 152.

In some embodiments, Action 402 may be performed prior to sending the first request to verify in this Action 403. In some of such embodiments, the sending in this Action 403 of the first request to verify may be performed with the proviso that the third node 113 may have determined, in Action 402, that the first domain lacks a previous authentication. For example, if the MNO of the communications system 100 has not previously authenticated that server IP for that SNI, e.g., the third node 113 may have a cache but these entries may not be found in the cache, the third node 113 may then send the first request to the first node 111 to run the verification.

Action 404

In this Action 404, the third node 113 may receive, in response to the sent first request, the message from the first node 111. The message indicates whether or not the second node 112 corresponding to the first IP address is the authentic owner of the first domain for the application.

The receiving of the message in this Action 404 may be performed e.g., via the second link 152.

In some embodiments, the message may be the Nsaf_Authentication Response message.

The message may either indicate that the authentication procedure performed by the first node 111 as described above is successful, e.g., the message may indicate AuthenticationResult=OK, or that the authentication procedure performed by the first node 111 failed, in which case the message may indicate e.g., AuthenticationResult=NOK.

The authentication procedure may have failed if the second node 112 may not have had a valid certificate for the target first domain, or if the first domain, e.g., the SNI in TLS Client Hello message, and the Common Name in the TLS Server Certificate message do not match, e.g., as the server certificate, although valid, does not correspond to the first domain.

If the authentication procedure performed by the first node 111 as described above is successful, the third node 113 may apply the corresponding logic, e.g., to manage traffic to the second node 112, and/or to report application volume to be charged as sponsored.

Otherwise, if the authentication procedure performed by the first node 111 fails, the third node 113 may apply the corresponding logic, such as e.g., to trigger an alarm, e.g., the FM alarm, such as for phishing detection, intrusion detection or classification of encrypted traffic, user notification of a potential phishing/intrusion attack, logging or even notifying the end user that the certificate is not valid, to increase a counter/statistic record, e.g., the PM record, for non-valid certificates, etc. . . . , and/or application volume to be charged as non-sponsored.

If the authentication procedure performed by the first node 111 fails, the third node 113 may apply the corresponding logic based on AuthenticationInfo, e.g., in the case of free rated or sponsored applications, that is, sponsored domains.

Figure 5:
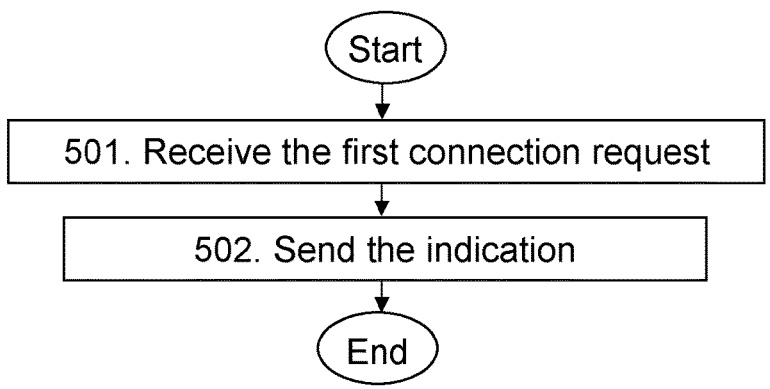
FIG. 5 is a flowchart depicting embodiments of a method in a second node, according to embodiments herein.

Embodiments of a computer-implemented method performed by the second node 112, will now be described with reference to the flowchart depicted in FIG. 5. The method may be understood to be for verifying the second node 112 as a server for the application. The second node 112 operates in the communications system 100.

The method may comprise the following actions. Several embodiments are comprised herein. In some embodiments, the method may comprise all actions. In other embodiments, the method may comprise two or more actions. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are depicted with dashed lines.

The detailed description of some of the following corresponds to the same references provided above, in relation to the actions described for the first node 111 and will thus not be repeated here to simplify the description. For example, In typical embodiments, the first node 111 and the third node 113 may be different nodes. In some embodiments, the second node 112 may be one of an Application Server and another node, and at least one of the following two options may apply with respect to the first node 111 and the third node 113.

According to a first option wherein the communications system 100 may be a 5G network, the first node 111 may be a first network function, and the third node 113 may be the UPF. The first node 111 may be referred to herein as the SAF, given the security functionality it performs.

According to the second option wherein the communications system 100 may be a 5G network, the third node 113 may be the first network function, e.g., the SAF, and the first node 111 may be network node managed by the first party different than a second party managing the third node 113.

According to a third option the communications system 100 may be a 4G network. In some of such embodiments, the first node 111 may be the first network node and the third node 113 may be one of a PGW-U, and a TDF-U.

Alternatively, the first node 111 and the third node 113 may be at least one of: co-localized and the same node. For example, the first node 111 may be a SAF which may be a (micro) service running in a UPF.

Action 501

In this Action 501, the second node 112 receives the first connection request from the first node 111 operating in the communications system 100. The first connection request comprises the first domain.

The receiving of the first connection request may be performed e.g., via the first link 151.

Action 502

In this Action 502, the second node 112 sends, in response to the received first connection request, the indication to the first node 111. The indication comprises the certificate of the second node 112.

The sending of the indication may be performed e.g., via the first link 151.

The method is performed by the second node 112 in the absence of subsequent request for application content from the first node 111 due to an inability of the first node 111 to request such content. In other words, the first node 111 may just be impersonating a client of the application in order to obtain the certificate, as only clients of the application may be enabled to receive such certificate. However, the first node 111 may not be able to be a client of the application, from the point of view of requesting application content, as it may lack a configuration, e.g., an installed configuration, that may enable it to do so.

Embodiments of a computer-implemented method, performed by the communications system 100, will now be described with reference to the flowchart depicted in FIG. 6. The method may be understood to be for verifying the second node 112 as the server for the application. The communications system 100 comprises at least the first node 111, the second node 112 and the third node 113.

The method may comprise the actions described below. In some embodiments some of the actions may be performed. In some embodiments all the actions may be performed. In FIG. 6, optional actions are indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

For example, In typical embodiments, the first node 111 and the third node 113 may be different nodes. In some embodiments, the second node 112 may be one of an Application Server and another node, and at least one of the following two options may apply with respect to the first node 111 and the third node 113.

According to a first option wherein the communications system 100 may be a 5G network, the first node 111 may be a first network function, and the third node 113 may be the UPF. The first node 111 may be referred to herein as the SAF, given the security functionality it performs.

According to the second option wherein the communications system 100 may be a 5G network, the third node 113 may be the first network function, e.g., the SAF, and the first node 111 may be network node managed by the first party different than a second party managing the third node 113.

According to a third option the communications system 100 may be a 4G network. In some of such embodiments, the first node 111 may be the first network node and the third node 113 may be one of a PGW-U, and a TDF-U.

Alternatively, the first node 111 and the third node 113 may be at least one of: co-localized and the same node. For example, the first node 111 may be a SAF which may be a (micro) service running in a UPF.

Action 601

This Action 601, which corresponds to Action 401, comprises, receiving, by the third node 113, from the first device 130 operating in the communications system 100, the second connection request towards the second node 112. The second connection request comprises the first IP address corresponding to the second node 112, and the first domain for the application.

Action 602

In some embodiments, the method may comprise, in this Action 602, which corresponds to Action 402, prior to sending 603 the first request to verify, determining, by the third node 113, whether or not the first domain for the application comprised in the received second connection request, has been previously authenticated. The sending 603 of the first request to verify may be performed with the proviso that the third node 113 may determine that the first domain lacks a previous authentication.

Action 603

In this Action 603, which corresponds to Action 403, the method comprises, by the third node 113, to the first node 111, the first request to verify the first IP address for the first domain for the application. The first node 111 is different than the second node 112.

Action 604

This Action 604, which corresponds to Action 301, comprises, obtaining, by the first node 111, the first request from the third node 113.

Action 605

In some embodiments, the method may comprise, in this Action 605, which corresponds to Action 302, prior to sending 607 the first connection request, sending, by the first node 111, the second request to the fourth node 114 operating in the communications system 100, thereby requesting the fourth node 114 to retrieve any previous authentication of the received first IP address.

Action 606

In some embodiments, the method may comprise, in this Action 606, which corresponds to Action 303, prior to sending 607 the first connection request, receiving, by the first node 111, the response from the fourth node 114, the response indicating whether or not the fourth node 114 was able to retrieve any previous authentication of the received first IP address. The sending 607 of the first connection request may be based on the received response.

Action 607

This Action 607, which corresponds to Action 304, comprises sending, by the first node 111, the first connection request to the second node 112 using the first IP address. The first connection request comprises the first domain indicated in the first request.

In some embodiments, the sending in this Action 607 of the first connection request may be performed with the proviso that one of: a) the fourth node 114 was unable to retrieve any stored domain corresponding to the received first IP address, and b) the previous authentication did not indicate the received first IP address is invalid for the first domain.

Action 608

This Action 608, which corresponds to Action 501, comprises receiving, by the second node 112, the first connection request from the first node 111.

Action 609

This Action 609, which corresponds to Action 502, comprises, sending, by the second node 112, in response to the received first connection request, the indication to the first node 111. The indication comprises the certificate of the second node 112.

The method is performed in the absence of subsequent request for application content application content from the first node 111 due to the inability of the first node 111 to request such content.

Action 610

This Action 610, which corresponds to Action 305, comprises receiving 610, by the first node 111, in response to the sent first connection request, the indication from the second node 112.

Action 611

This Action 611, which corresponds to Action 306, comprises, validating and authenticating, by the first node 111, the certificate as corresponding to the first domain.

In some embodiments, the validating and authenticating the certificate in this Action 611 may further comprise decrypting the certificate.

Action 612

This Action 612, which corresponds to Action 307, comprises sending, by the first node 111, the message to the third node 113 based on the result of the validation and authentication.

Action 613

In some embodiments, the method may comprise, in this Action 613, which corresponds to Action 403, receiving, by the third node 113, in response to the sent first request, the message from the first node 111, the message indicating whether or not the second node 112 corresponding to the IP address is the authentic owner of the first domain for the application.

Action 614

In some embodiments, the method may comprise, in this Action 614, which corresponds to Action 308, after validating and authenticating 611 the certificate as corresponding to the first domain, sending, by the first node 111, the third request to the fourth node 114 to store the further indication indicating the result of the validation and authentication. The sending of the third request may be performed one of: after every performance of the validation and authentication, and periodically.

In some embodiments of any of the above, at least one of the following may apply: a) the first domain may be an SNI, b) the certificate may comprises a Common Name, c) the first request may be a Nsaf_Authentication Request, d) the message may be a Nsaf_Authentication Response message, e) the first connection request may be a TLS Client Hello message, f) the indication may be a TLS Certificate message comprising the Common Name and the certificate corresponding to the second node 112, and g) the second connection request may be a TLS Client Hello message.

Figure 7:
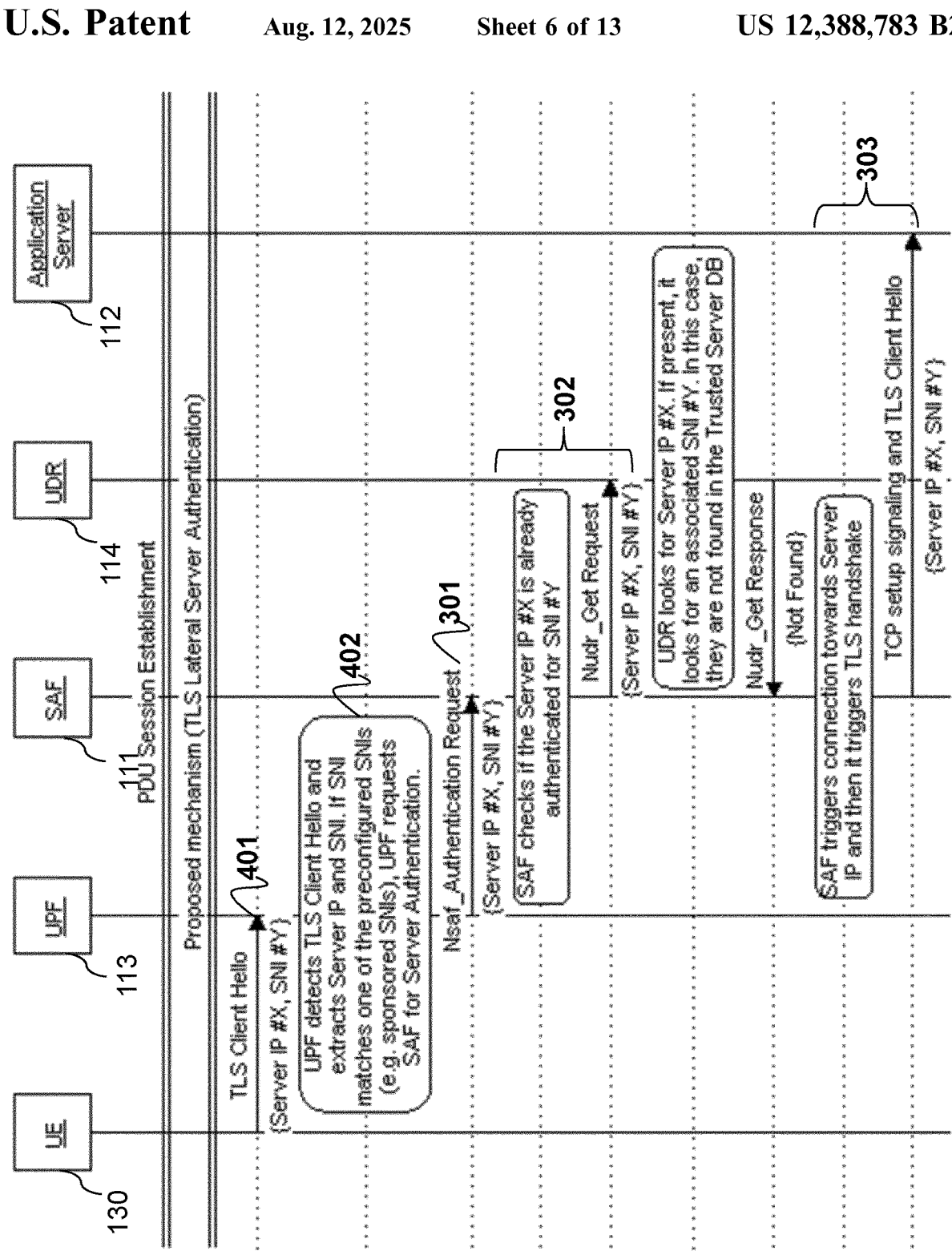
FIG. 7 is a schematic diagram depicting a non-limiting example of signalling between nodes in a communications system, according to embodiments herein.
Figure 7:
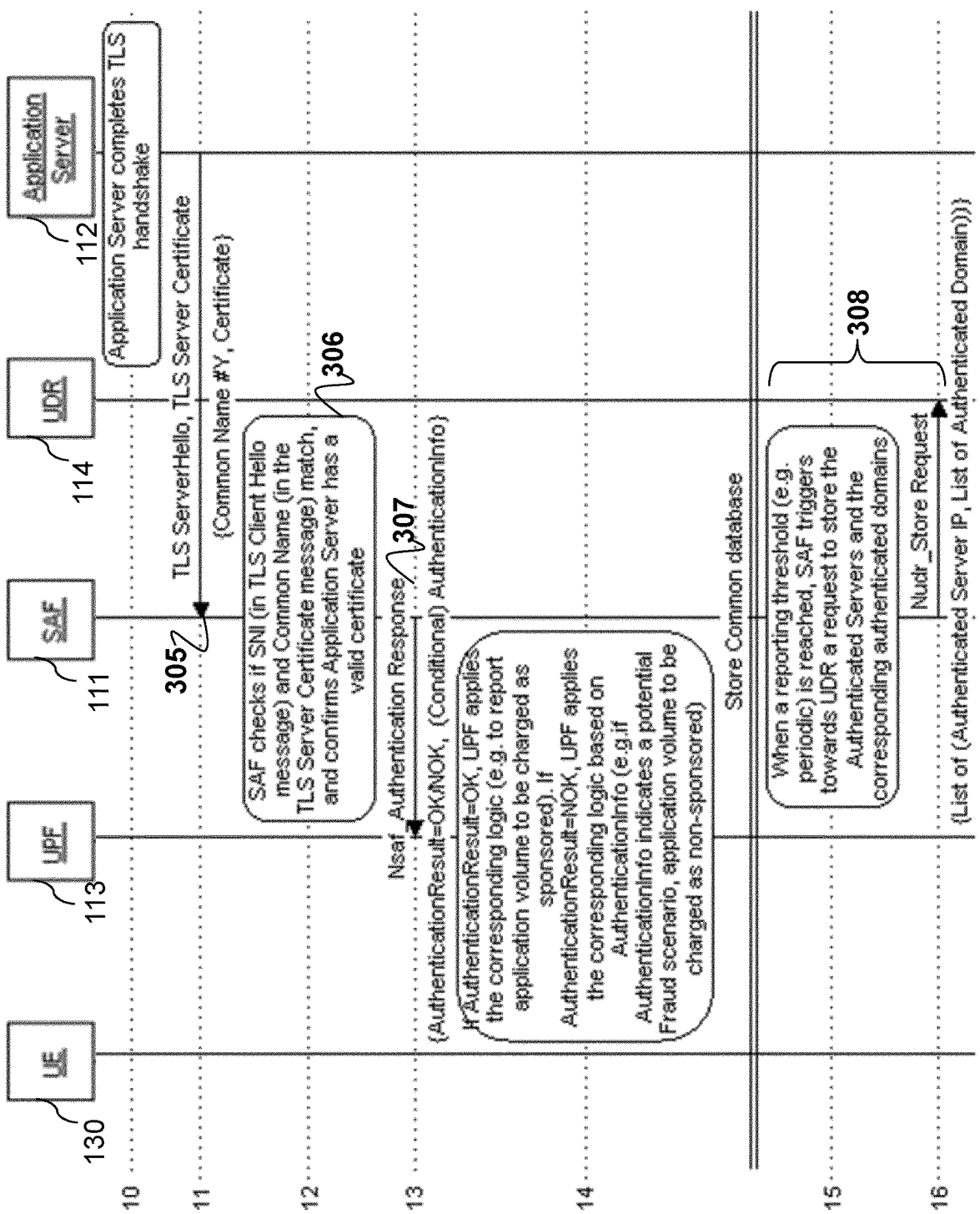
Figure 7:
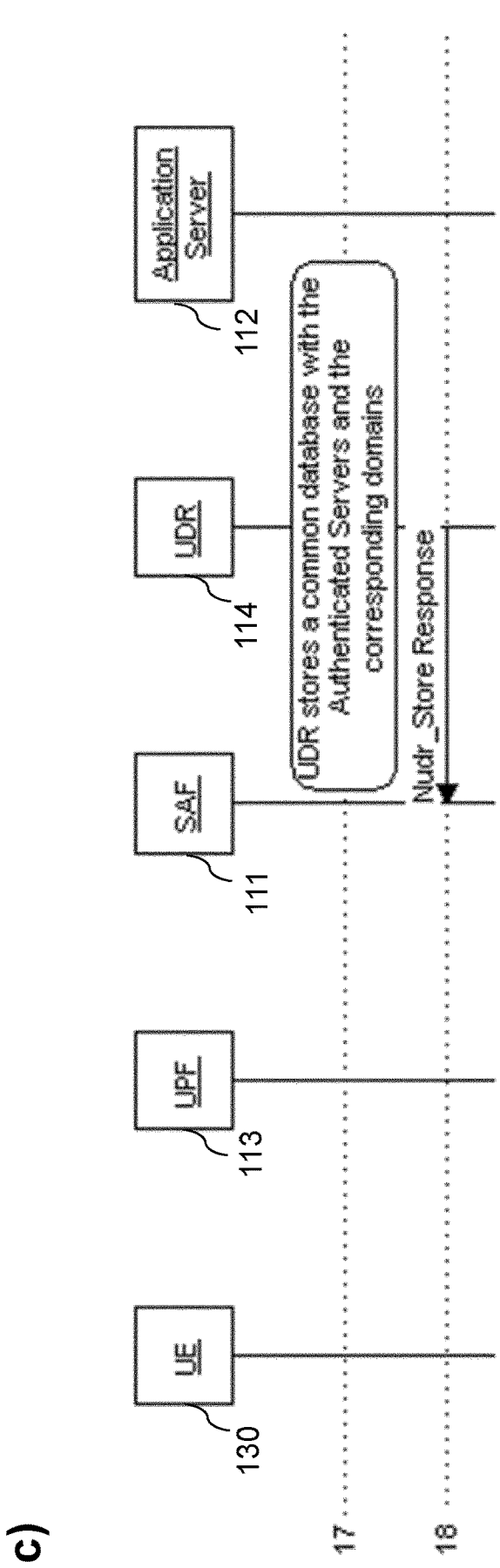

FIG. 7 shows a sequence diagram depicting a first non-limiting example of embodiments herein illustrating a use case of fraud detection and/or prevention. The steps of this example are detailed below. In this non-limiting example, the first node 111 is a SAF, the second node 112 is an Application Server, the third node 113 is a UPF, the fourth node 114 is a UDR, and the first device 130 is a UE. The signalling diagram extends from FIG. 7 a) to FIG. 7 b) and FIG. 7 c). As preconditions for this example, a PDU session is already established for the first device 130, and the third node 113 is configured, e.g., either locally or from an SMF, to apply the fraud detection logic described in steps below. This logic may be restricted to some preconfigured sponsored domains, e.g., example.com. In step 1, the first device 130, e.g., a user of a UE, opens an application, e.g., example.com, and sends application data towards the second node 112, that is, the application server, e.g., Server IP #X, specifically as part of TLS handshake, it triggers a TLS Client Hello message including SNI #Y. This "second connection request" is received by the third node 113 in agreement with Action 401. In Steps 2 and 3, the third node 113 detects a TLS Client Hello and extracts the Server IP and SNI. If, in agreement with Action 402, the third node 113 determines that the SNI matches one of the preconfigured SNIs, e.g. sponsored SNIs, the third node 113 requests the first node 111 for Server Authentication, by the third node 113 triggering a Nsaf_Authentication message including the following parameters: a) Server IP, which identifies the IP address of the Application Server to be authenticated, and b) SNI, which identifies the domain for which the Application Server is to be authenticated. The first node 111 receives the "first request" in agreement with Action 301. The third node 113 may have a local cache for previously authenticated servers. In this example, it is assumed this cache is either empty or the required entry is not found. In steps 4 and 5, the first node 111, in agreement with Action 302, checks if the Server IP #X is already authenticated for SNI #Y, by the first node 111 triggering towards the fourth node 114 a Nudr_Get Request message including the following parameters: a) the Server IP, which identifies the IP address of the Application Server to be authenticated, and b) the SNI, which identifies the domain for which the Application Server is to be authenticated. As above, the first node 111 may also have a local cache for previously authenticated servers. In this example, it is assumed this cache is either empty or the required entry is not found. In steps 6 and 7, the fourth node 114 looks, in the database, for MNO trusted/authenticated servers, for Server IP #X. If present, it looks for an associated SNI #Y. In this example, they are not found in the trusted/authenticated server database, so the fourth node 114 answers the first node 111 with a Nudr_Get Response message indicating that (Not Found). In steps 8 and 9, the first node 111, in agreement with Action 3003, triggers a TCP connection towards the Server IP #X and then it triggers TLS handshake. For simplicity, this is shown in the sequence diagram in a single step in step 9, which includes the TCP setup signaling and the TLS Client Hello message, including the SNI #Y. Continuing in FIG. 7 b), at step 10 and 11, the second node 112, completes the TLS handshake. For simplicity, this is shown in the sequence diagram in a single step, step 11, which includes the TLS Server Hello and the TLS Server Certificate, which includes the certificate and the Common Name #Y. This is received by the first node 111 in agreement with Actin 305. In step 12, the first node 111 checks, in agreement with Action 306, if the SNI in TLS Client Hello message and the Common Name in the TLS Server Certificate message, match, that is, if they are equal or in case of wildcard certificates there is a match, e.g., SNI=www.example.com and CN=*.example.com, where CN corresponds to a wildcard certificate which applies to different subdomains. The first node 111 also checks that the second node 112 has a valid certificate, e.g., by checking against a list of trusted CAs or Certificate Authorities. In step 13, if the above checks, step 12, are successful, the first node 111, in agreement with Action 307, triggers towards the third node 113 a Nsaf_Authentication Response message indicating successful operation, e.g., "Authentication=OK". Otherwise, if the above checks, step 12, are unsuccessful, the first node 111, in agreement with Action 307, triggers towards the third node 113 a Nsaf_Authentication Response message indicating unsuccessful operation, e.g., "Authentication=NOK" and including AuthenticationInfo, which may indicate which of the checks in Step 12 have failed. In step 14, if AuthenticationResult=OK, the third node 113 applies the corresponding logic, e.g., to report application volume to be charged as sponsored. If AuthenticationResult=NOK, the third node 113 applies the corresponding logic based on AuthenticationInfo, e.g., in the case of free rated or sponsored applications, e.g., sponsored domains. If the Server (IP #X) has no valid certificate for the target SNI (SNI #Y), as SNI #Y corresponds to a sponsored domain, the application volume may be charged as non-sponsored. Additionally, other actions may be triggered, e.g., to increase a counter/stat (PM) for non-valid certificates, to trigger an alarm (FM), logging or even notifying the end user that the certificate is not valid. If the SNI, in the TLS Client Hello message, and the Common Name, in the TLS Server Certificate message, do not match, as the SNI #Y corresponds to a sponsored domain, the application volume may be charged as non-sponsored, as the server certificate, although valid, does not correspond to the sponsored domain #Y. This example sequence diagram only shows the fraud scenario, that is, the TLS lateral server authentication mechanism is applied to a list of free rated or sponsored domains. But in general, the TLS lateral server authentication mechanism may be applied for many other Use Cases such as e.g., phishing detection, intrusion detection or classification of encrypted traffic. For example, other actions may be triggered, e.g., user notification of a potential phishing/intrusion attack. In steps 15 and 16, when a reporting threshold, e.g., periodic, is reached, the first node 111, in agreement with Action 308, triggers towards the fourth node 114 a request to store the Authenticated Servers and the corresponding SNIs, by triggering a Nudr_Store Request message including the following parameters: a) List of (Server IP, List of SNI)); alternatively, it may store the Server IP: CN relationship, see reasoning below, and b) for each Server IP, every SNI is authenticated, e.g., for IP #X, the third node 113 detects a TLS CH with SNI #Y1 and, for another user session, for the same IP #X, the third node 113 detects a TLS CH with SNI #Y2, so it is proposed to trigger the authentication procedure for both SNIs.

Case 1:
   SNI #Y1: www.example1.com (CN: www.example1.com).
   SNI #Y2: www.example2.com (CN: www.example2.com)

Case 2:
   SNI #Y1: subdomain1.example.com (CN: *.example.com).
   SNI #Y2: subdomain2.example.com (CN: *.example.com)

In Case 2, there is a wildcard certificate where the CN covers for multiple subdomains, so it may be understood to be more efficient to store/cache the IP: CN relationship, instead of the IP: SNI relationship. Additionally, only in Case 2, if the first node 111 has already authenticated Server IP #X and SNI #Y1, there is no need for the first node 111 to authenticate Server IP #X and SNI #Y2. In step 17, the fourth node 114 stores a common database with all the MNO Authenticated Servers and the corresponding Authenticated domains, either as SNIs or CNs. The fourth node 114 may generate a common database based on information generated by the different third nodes 113/first nodes 111 in the communications system 100. In step 18, the first node 111 answers SAF with a Nudr_Store Response message indicating successful operation. Additionally, each fourth node 114 may locally store in memory, as a cache, the database obtained, through the mechanism described above, by that particular third node 113. Alternatively, the first node 111 may be a (micro) service running in the third node 113.

It may be understood that particular embodiments herein provide, a TLS lateral server name discovery and lateral server authentication mechanism.

Certain embodiments disclosed herein may provide one or more of the following technical advantage(s), which may be summarized as follows.

As a first advantage, embodiments herein may be understood to allow a network operator to prevent fraud, phishing and intrusion.

As another advantage, embodiments herein may be understood to enable not having to rely on DNS, and thereby avoid problems such as DNS cache poisoning.

As a further advantage, embodiments herein may be understood to also allow the network operator to classify encrypted traffic, such as when SNI is encrypted and/or DNS is encrypted with DoH/DoT.

Figure 6:
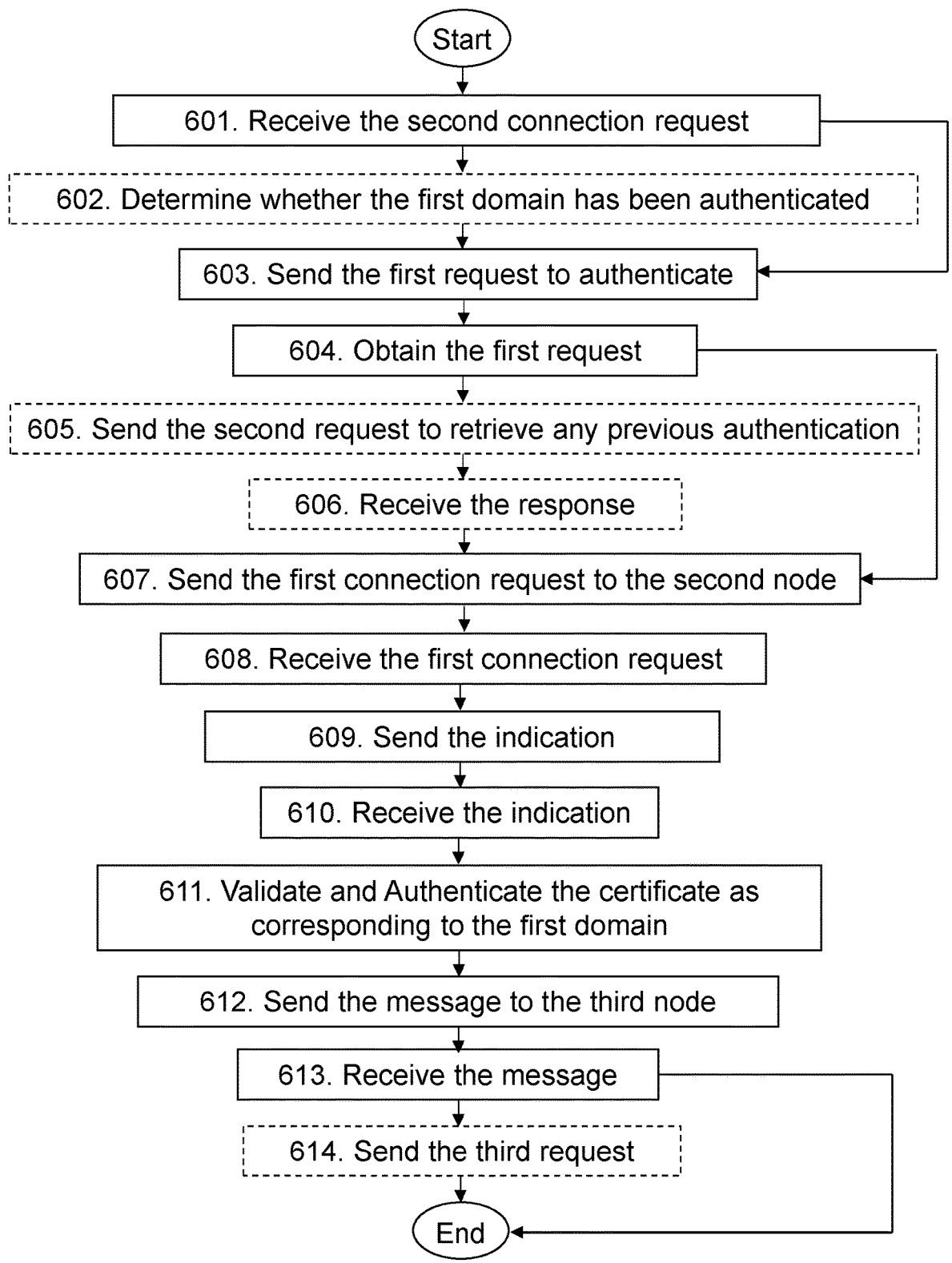
FIG. 6 is a flowchart depicting embodiments of a method in a communications system, according to embodiments herein.
Figure 8:
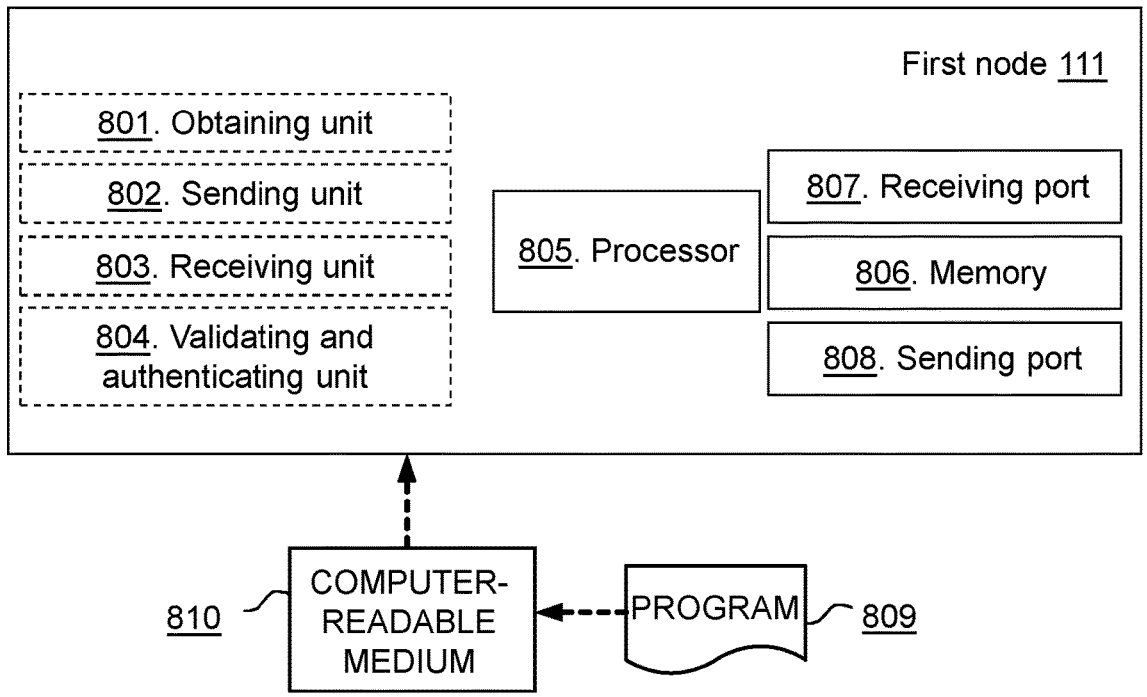
FIG. 8 is a schematic block diagram illustrating two non-limiting examples, a) and b), of a first node, according to embodiments herein.
Figure 8:
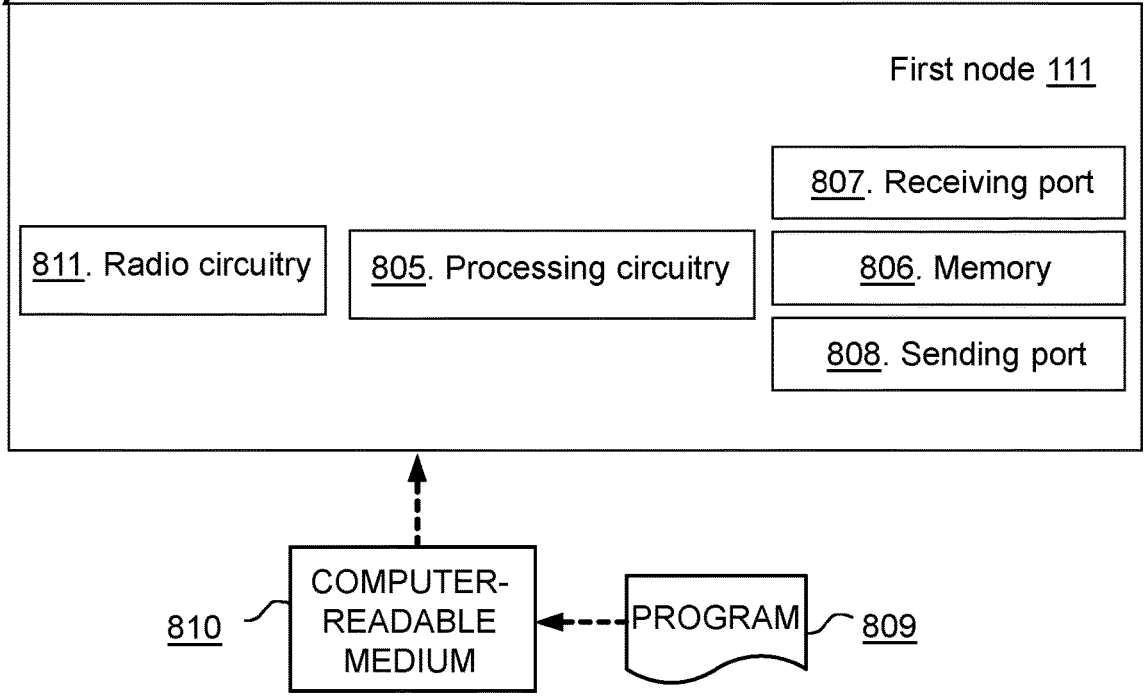

FIG. 8 depicts two different examples in panels a) and b), respectively, of the arrangement that the first node 111 may comprise to perform the method actions described above in relation to FIG. 3, and/or FIGS. 6-7. In some embodiments, the first node 111 may comprise the following arrangement depicted in FIG. 8a. The first node 111 may be understood to be for verifying the second node 112 as the server for the application. The first node 111 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 8, optional boxes are indicated by dashed lines. The detailed description of some of the following corresponds to the same references provided above, in relation to the actions described for the first node 111 and will thus not be repeated here. For example, in typical embodiments, the first node 111 and the third node 113 may be configured to be different nodes. In some embodiments, the second node 112 may be configured to operate one of the Application Server and the another node, and at least one of the following three options may apply.

According to a first option wherein the communications system 100 may be configured to be a 5G network, the first node 111 may be configured to be a first network function, and the third node 113 may be configured to be the UPF. The first node 111 may be referred to herein as the SAF, given the security functionality it performs.

According to the second option wherein the communications system 100 may be configured to be a 5G network, the third node 113 may be configured to be the first network function, e.g., the SAF, and the first node 111 may be configured to be the network node managed by the first party different than the second party managing the third node 113.

According to a third option the communications system 100 may be configured to be a 4G network. In some of such embodiments, the first node 111 may be configured to be the first network node and the third node 113 may be configured to be one of a PGW-U, and a TDF-U.

Alternatively, the first node 111 and the third node 113 may be configured to be at least one of: co-localized and the same node. For example, the first node 111 may be configured to be a SAF which may be a (micro) service running in a UPF.

The first node 111 is configured to, e.g. by means of an obtaining unit 801 within the first node 111 configured to, obtain, from the third node 113 configured to operate in the communications system 100, the first request to verify the first IP address for the first domain for the application. The first request is configured to indicate the first domain and the first IP address.

The first node 111 is also configured to, e.g. by means of a sending unit 802 within the first node 111 configured to, send the first connection request to the second node 112 using the first IP address. The first connection request is configured to comprise the first domain configured to be indicated in the first request.

In some embodiments, the first node 111 may be configured to, e.g. by means of a receiving unit 803 within the first node 111 configured to, receive, in response to the first connection request configured to be sent, the indication from the second node 112. The indication is configured to comprise the certificate of the second node 112.

In some embodiments, the first node 111 may be configured to, e.g. by means of a validating and authenticating unit 804 within the first node 111 configured to, validate and authenticate the certificate as corresponding to the first domain.

The first node 111 may be further configured to, e.g. by means of the sending unit 802 further configured to, send the message to the third node 113 based on the result of the validation and authentication.

In some embodiments, the first node 111 may be further configured to, e.g. by means of the sending unit 802 further configured to, prior to sending the first connection request, send the second request to the fourth node 114 configured to operate in the communications system 100, thereby requesting the fourth node 114 to retrieve any previous authentication of the first IP address configured to be received.

In some embodiments, the first node 111 may be further configured to, e.g. by means of the receiving unit 803 further configured to, prior to sending the first connection request, receive the response from the fourth node 114. The response may be configured to indicate whether or not the fourth node 114 was able to retrieve any previous authentication of the received first IP address.

The sending of the first connection request may be configured to be based on the response configured to be received.

In some embodiments, the sending of the first connection request may be configured to be performed with the proviso that one of: a) the fourth node 114 was unable to retrieve any stored domain corresponding to the received first IP address, and b) the previous authentication did not indicate the received first IP address is invalid for the first domain.

In some embodiments, the first node 111 may be further configured to, e.g. by means of the sending unit 802 further configured to, after validating and authenticating the certificate as corresponding to the first domain, send the third request to the fourth node 114 to store the further indication configured to indicate the result of the validation and authentication. The sending of the third request may be configured to be performed one of: after every performance of the validation and authentication, and periodically.

In some embodiments, at least one of: a) the first domain may be configured to be the SNI, b) the certificate may be configured to comprise the Common Name, c) the first request may be configured to be the Nsaf_Authentication Request, d) the message may be configured to be the Nsaf_Authentication Response message, e) the first connection request may be configured to be the TLS Client Hello message, and f) the indication may be configured to be the TLS Certificate message comprising the Common Name and the certificate corresponding to the second node 112.

In some embodiments, the validating and authenticating the certificate may be further configured to comprise decrypting the certificate.

The embodiments herein may be implemented through one or more processors, such as a processor 805 in the first node 111 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 806 comprising one or more memory units. The memory 806 is arranged to be used to store obtained information, store data, configurations, schedulings, and applications etc. to perform the methods herein when being executed in the first node 111.

In some embodiments, the first node 111 may receive information from, e.g., the second node 112, the third node 113, the fourth node 114, the another node and/or the first device 130 through a receiving port 807. In some examples, the receiving port 807 may be, for example, connected to one or more antennas in the first node 111. In other embodiments, the first node 111 may receive information from another structure in the communications system 100 through the receiving port 807. Since the receiving port 807 may be in communication with the processor 805, the receiving port 807 may then send the received information to the processor 805. The receiving port 807 may also be configured to receive other information.

The processor 805 in the first node 111 may be further configured to transmit or send information to e.g., the second node 112, the third node 113, the fourth node 114, the another node, the first device 130, and/or another structure in the communications system 100, through a sending port 808, which may be in communication with the processor 805, and the memory 806.

Those skilled in the art will also appreciate that any of the units 801-804 described above may refer to a combination of analog and digital circuits, and/or one or more processors configured with software and/or firmware, e.g., stored in memory, that, when executed by the one or more processors such as the processor 805, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 801-804 described above may be the processor 805 of the first node 111, or an application running on such processor.

Thus, the methods according to the embodiments described herein for the first node 111 may be respectively implemented by means of a computer program 809 product, comprising instructions, i.e., software code portions, which, when executed on at least one processor 805, cause the at least one processor 805 to carry out the actions described herein, as performed by the first node 111. The computer program 809 product may be stored on a computer-readable storage medium 810. The computer-readable storage medium 810, having stored thereon the computer program 809, may comprise instructions which, when executed on at least one processor 805, cause the at least one processor 805 to carry out the actions described herein, as performed by the first node 111. In some embodiments, the computer-readable storage medium 810 may be a non-transitory computer-readable storage medium, such as a CD ROM disc, a memory stick, or stored in the cloud space. In other embodiments, the computer program 809 product may be stored on a carrier containing the computer program, wherein the carrier is one of an electronic signal, optical signal, radio signal, or the computer-readable storage medium 810, as described above.

The first node 111 may comprise an interface unit to facilitate communications between the first node 111 and other nodes or devices, e.g., the second node 112, the third node 113, the fourth node 114, the another node, the first device 130, and/or another structure in the communications system 100. In some particular examples, the interface may, for example, include a transceiver configured to transmit and receive radio signals over an air interface in accordance with a suitable standard.

In other embodiments, the first node 111 may comprise the following arrangement depicted in FIG. 8b. The first node 111 may comprise a processing circuitry 805, e.g., one or more processors such as the processor 805, in the first node 111 and the memory 806. The first node 111 may also comprise a radio circuitry 811, which may comprise e.g., the receiving port 807 and the sending port 808. The processing circuitry 805 may be configured to, or operable to, perform the method actions according to FIG. 3, and/or FIGS. 6-7, in a similar manner as that described in relation to FIG. 8a. The radio circuitry 811 may be configured to set up and maintain at least a wireless connection with the second node 112, the third node 113, the fourth node 114, the another node, the first device 130, and/or another structure in the communications system 100.

Hence, embodiments herein also relate to the first node 111 operative for verifying the second node 112 as the server for the application, the first node 111 being operative to operate in the communications system 100. The first node 111 may comprise the processing circuitry 805 and the memory 806, said memory 806 containing instructions executable by said processing circuitry 805, whereby the first node 111 is further operative to perform the actions described herein in relation to the first node 111, e.g., in FIG. 3, and/or FIGS. 6-7.

Figure 9:
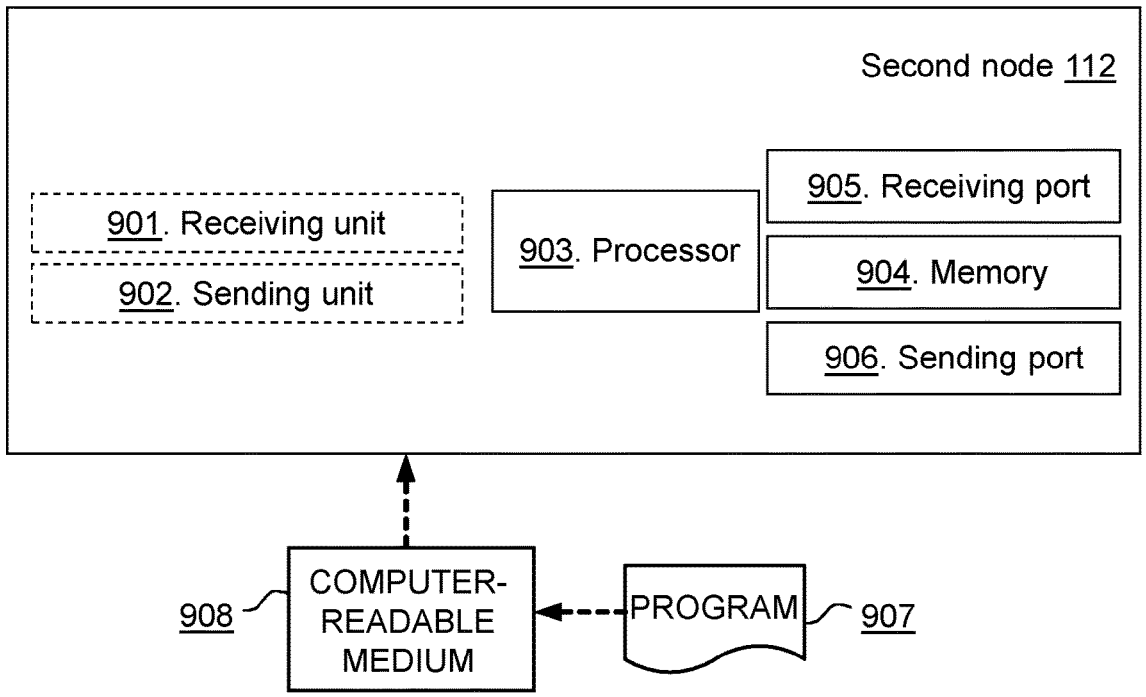
FIG. 9 is a schematic block diagram illustrating two non-limiting examples, a) and b), of a second node, according to embodiments herein.
Figure 9:
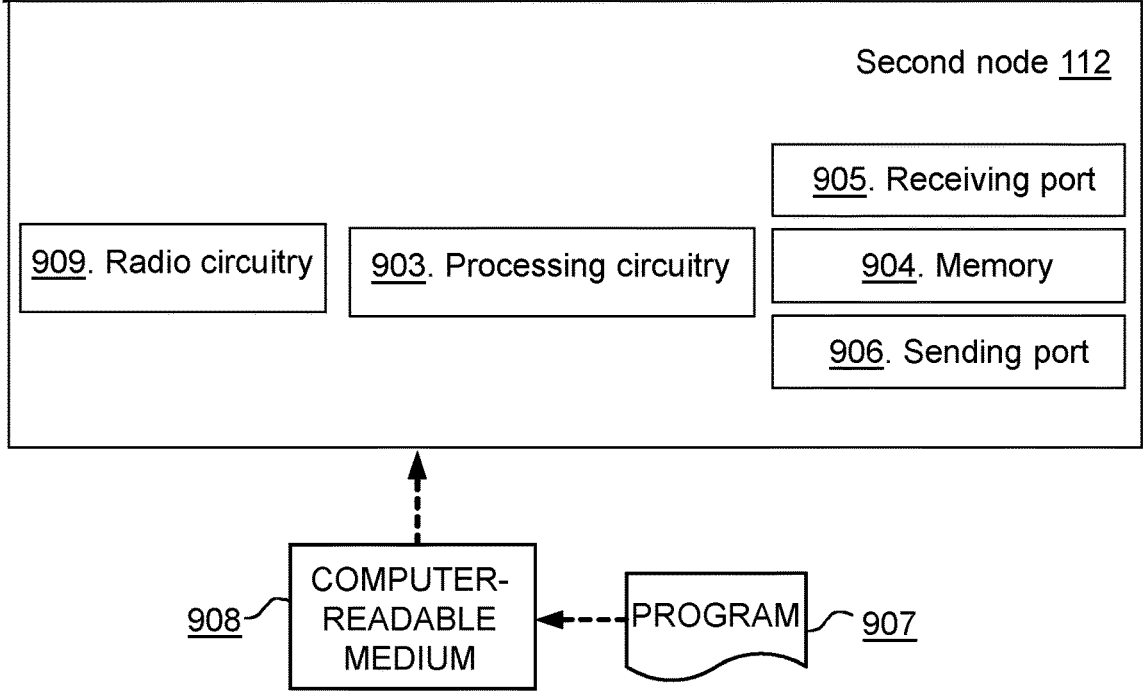

FIG. 9 depicts two different examples in panels a) and b), respectively, of the arrangement that the second node 112 may comprise to perform the method actions described above in relation to FIG. 4, and/or FIGS. 6-7. In some embodiments, the second node 112 may comprise the following arrangement depicted in FIG. 9a. The second node 112 may be understood to be for verifying the second node 112 as the server for the application. The second node 112 is configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the second node 112 and will thus not be repeated here. For example, in typical embodiments, the first node 111 and the third node 113 may be configured to be different nodes. In some embodiments, the second node 112 may be configured to operate one of the Application Server and the another node, and at least one of the following three options may apply.

According to a first option wherein the communications system 100 may be configured to be a 5G network, the first node 111 may be a first network function, and the third node 113 may be configured to be the UPF. The first node 111 may be referred to herein as the SAF, given the security functionality it performs.

According to the second option wherein the communications system 100 may be configured to be a 5G network, the third node 113 may be configured to be the first network function, e.g., the SAF, and the first node 111 may be configured to be the network node managed by the first party different than the second party managing the third node 113.

According to a third option the communications system 100 may be configured to be a 4G network. In some of such embodiments, the first node 111 may be configured to be the first network node and the third node 113 may be configured to be one of a PGW-U, and a TDF-U.

Alternatively, the first node 111 and the third node 113 may be configured to be at least one of: co-localized and the same node. For example, the first node 111 may be configured to be a SAF which may be a (micro) service running in a UPF.

The second node 112 is configured to, e.g. by means of a receiving unit 901 within the second node 112 configured to, receive, the first connection request from the first node 111 configured to operate in the communications system 100. The first connection request is configured to comprise the first domain.

The second node 112 is also configured to, e.g. by means of a sending unit 902 within the second node 112 configured to, send, in response to the first connection request configured to be received, the indication to the first node 111. The indication is configured to comprise the certificate of the second node 112. The second node 112 is configured to perform these actions in the absence of subsequent request for application content application content from the first node 111 due to the inability of the first node 111 to request such content.

The embodiments herein may be implemented through one or more processors, such as a processor 903 in the second node 112 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 904 comprising one or more memory units. The memory 904 is arranged to be used to store obtained information, store data, configurations, schedulings, and applications etc. to perform the methods herein when being executed in the second node 112.

In some embodiments, the second node 112 may receive information from, e.g., the first node 111, the third node 113, the fourth node 114, the another node, and/or the first device 130 through a receiving port 905. In some examples, the receiving port 905 may be, for example, connected to one or more antennas in the second node 112. In other embodiments, the second node 112 may receive information from another structure in the communications system 100 through the receiving port 905. Since the receiving port 905 may be in communication with the processor 903, the receiving port 905 may then send the received information to the processor 903. The receiving port 905 may also be configured to receive other information.

The processor 903 in the second node 112 may be further configured to transmit or send information to e.g., the first node 111, the third node 113, the fourth node 114, the another node, the first device 130 and/or another structure in the communications system 100, through a sending port 906, which may be in communication with the processor 903, and the memory 904.

Those skilled in the art will also appreciate that any of the units 901-902 described above may refer to a combination of analog and digital circuits, and/or one or more processors configured with software and/or firmware, e.g., stored in memory, that, when executed by the one or more processors such as the processor 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 901-902 described above may be the processor 903 of the second node 112, or an application running on such processor.

Thus, the methods according to the embodiments described herein for the second node 112 may be respectively implemented by means of a computer program 907 product, comprising instructions, i.e., software code portions, which, when executed on at least one processor 903, cause the at least one processor 903 to carry out the actions described herein, as performed by the second node 112. The computer program 907 product may be stored on a computer-readable storage medium 908. The computer-readable storage medium 908, having stored thereon the computer program 907, may comprise instructions which, when executed on at least one processor 903, cause the at least one processor 903 to carry out the actions described herein, as performed by the second node 112. In some embodiments, the computer-readable storage medium 908 may be a non-transitory computer-readable storage medium, such as a CD ROM disc, a memory stick, or stored in the cloud space. In other embodiments, the computer program 907 product may be stored on a carrier containing the computer program, wherein the carrier is one of an electronic signal, optical signal, radio signal, or the computer-readable storage medium 908, as described above.

The second node 112 may comprise an interface unit to facilitate communications between the second node 112 and other nodes or devices, e.g., the first node 111, the third node 113, the fourth node 114, the another node, the first device 130 and/or another structure in the communications system 100. In some particular examples, the interface may, for example, include a transceiver configured to transmit and receive radio signals over an air interface in accordance with a suitable standard.

In other embodiments, the second node 112 may comprise the following arrangement depicted in FIG. 9b. The second node 112 may comprise a processing circuitry 903, e.g., one or more processors such as the processor 903, in the second node 112 and the memory 904. The second node 112 may also comprise a radio circuitry 909, which may comprise e.g., the receiving port 905 and the sending port 906. The processing circuitry 903 may be configured to, or operable to, perform the method actions according to FIG. 4, and/or FIGS. 6-7, in a similar manner as that described in relation to FIG. 9a. The radio circuitry 909 may be configured to set up and maintain at least a wireless connection with the first node 111, the third node 113, the fourth node 114, the another node, the first device 130 and/or another structure in the communications system 100.

Hence, embodiments herein also relate to the second node 112 operative for verifying the second node 112 as the server for the application, the second node 112 being operative to operate in the communications system 100. The second node 112 may comprise the processing circuitry 903 and the memory 904, said memory 904 containing instructions executable by said processing circuitry 903, whereby the second node 112 is further operative to perform the actions described herein in relation to the second node 112, e.g., in FIG. 4, and/or FIGS. 6-7.

Figure 10:
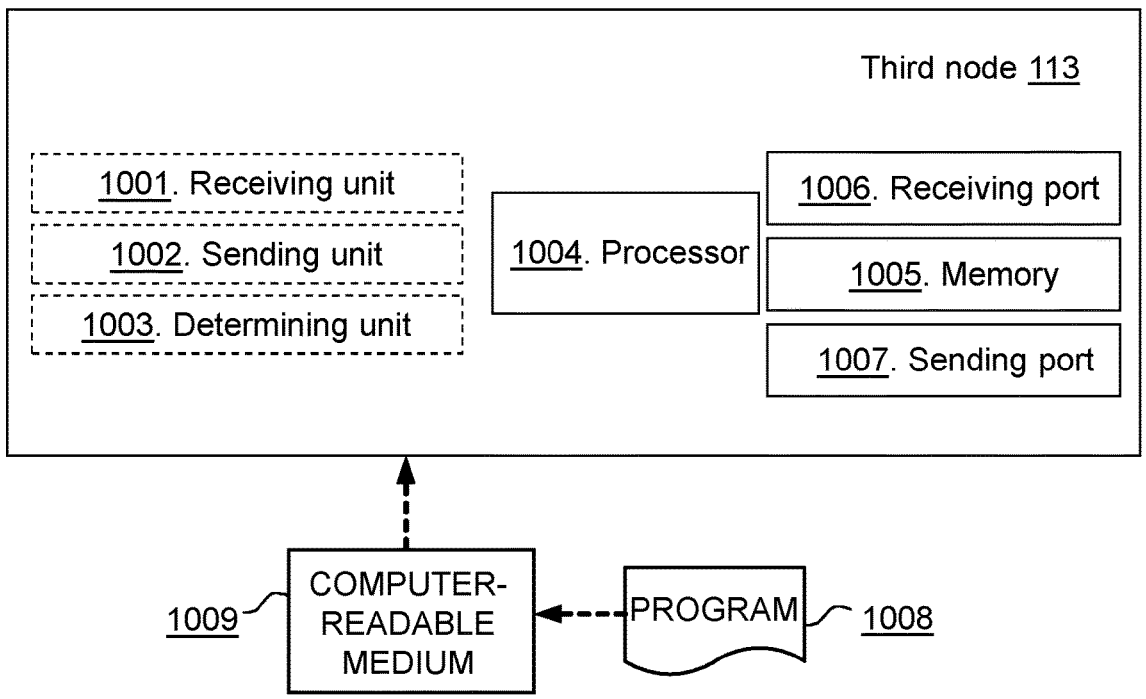
FIG. 10 is a schematic block diagram illustrating two non-limiting examples, a) and b), of a third node, according to embodiments herein.
Figure 10:
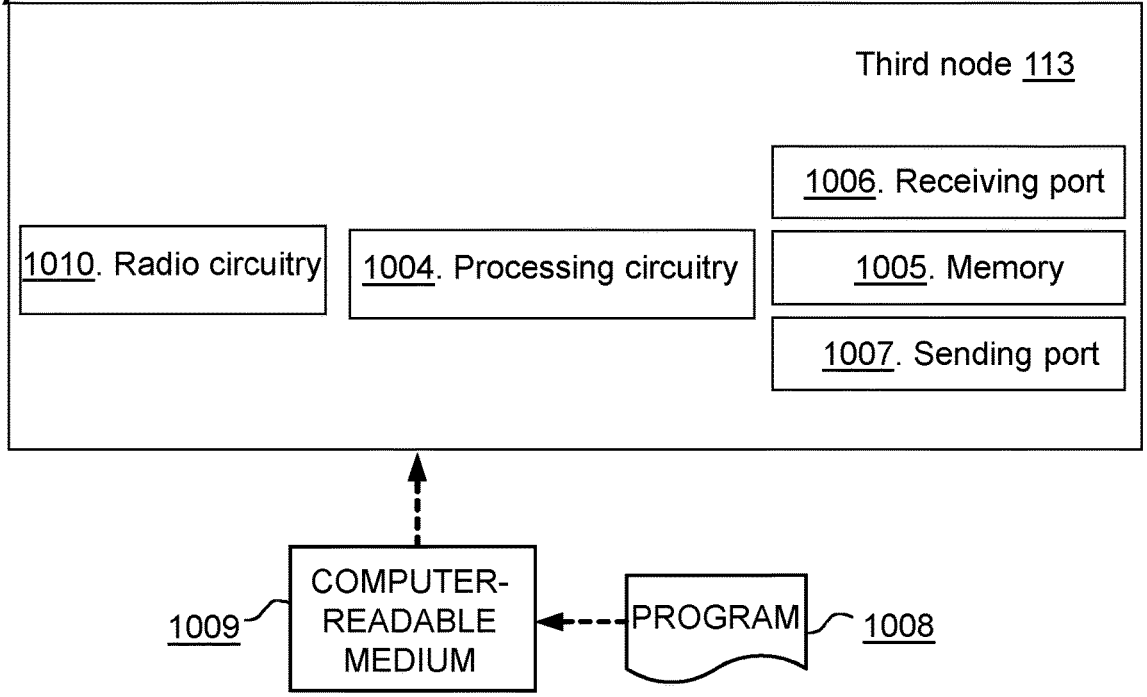

FIG. 10 depicts two different examples in panels a) and b), respectively, of the arrangement that the third node 113 may comprise to perform the method actions described above in relation to FIG. 5, and/or FIGS. 6-7. In some embodiments, the third node 113 may comprise the following arrangement depicted in FIG. 10a. The third node 113 may be understood to be for verifying the second node 112 as the server for the application. The third node 113 may be configured to operate in the communications system 100.

Several embodiments are comprised herein. Components from one embodiment may be tacitly assumed to be present in another embodiment and it will be obvious to a person skilled in the art how those components may be used in the other exemplary embodiments. In FIG. 10, optional boxes are indicated by dashed lines. The detailed description of some of the following corresponds to the same references provided above, in relation to the actions described for the third node 113 and will thus not be repeated here. For example, in typical embodiments, the first node 111 and the third node 113 may be configured to be different nodes. In some embodiments, the second node 112 may be configured to be one of the Application Server, and at least one of the following three options may apply.

According to a first option wherein the communications system 100 may be configured to be a 5G network, the first node 111 may be configured to be a first network function, and the third node 113 may be configured to be the UPF. The first node 111 may be referred to herein as the SAF, given the security functionality it performs.

According to the second option wherein the communications system 100 may be configured to be a 5G network, the third node 113 may be configured to be the first network function, e.g., the SAF, and the first node 111 may be configured to be the network node managed by the first party different than the second party managing the third node 113.

According to a third option the communications system 100 may be configured to be a 4G network. In some of such embodiments, the first node 111 may be configured to be the first network node and the third node 113 may be configured to be one of a PGW-U, and a TDF-U.

Alternatively, the first node 111 and the third node 113 may be configured to be at least one of: co-localized and the same node. For example, the first node 111 may be configured to be a SAF which may be a (micro) service running in a UPF.

The third node 113 is configured to, e.g. by means of a receiving unit 1001 within the third node 113 configured to, receive, from the first device 130 configured to operate in the communications system 100, the second connection request towards the second node 112. The second connection request is configured to comprise the first IP address corresponding to the second node 112, and the first domain for the application.

The third node 113 is also configured to, e.g. by means of a sending unit 1002 within the third node 113 configured to, send, by the third node 113, to the first node 111, the first request to verify the first IP address for the first domain for the application. The first node 111 is configured to be different than the second node 112.

The third node 113 is configured to, e.g. by means of the receiving unit 1001 within the third node 113 configured to, receive, in response to the sent first request, the message from the first node 111. The message is configured to indicate whether or not the second node 112 corresponding to the first IP address is the authentic owner of the first domain for the application.

The third node 113 may be further configured to, e.g. by means of a determining unit 1003 within the third node 113 configured to, prior to sending the first request to verify, determine whether or not the first domain for the application configured to be comprised in the second connection request configured to be received, has been previously authenticated. The sending of the first request to verify may be configured to be performed with the proviso that the third node 113 determines that the first domain lacks a previous authentication.

In some embodiments, at least one of: a) the first domain may be configured to be the SNI, b) the first request may be configured to be the Nsaf_Authentication Request, c) the message may be configured to be the Nsaf_Authentication Response message, and d) the second connection request may be configured to be the TLS Client Hello message.

The embodiments herein may be implemented through one or more processors, such as a processor 1004 in the third node 113 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the third node 113. One such carrier may be in the form of a CD ROM disc. It is however feasible with other data carriers such as a memory stick. The computer program code may furthermore be provided as pure program code on a server and downloaded to the third node 113.

The third node 113 may further comprise a memory 1005 comprising one or more memory units. The memory 1005 is arranged to be used to store obtained information, store data, configurations, schedulings, and applications etc. to perform the methods herein when being executed in the third node 113.

In some embodiments, the third node 113 may receive information from, e.g., the first node 111, the second node 112, the fourth node 114, and/or any of the first device 130, through a receiving port 1006. In some examples, the receiving port 1006 may be, for example, connected to one or more antennas in the third node 113. In other embodiments, the third node 113 may receive information from another structure in the communications system 100 through the receiving port 1006. Since the receiving port 1006 may be in communication with the processor 1004, the receiving port 1006 may then send the received information to the processor 1004. The receiving port 1006 may also be configured to receive other information.

The processor 1004 in the third node 113 may be further configured to transmit or send information to e.g., the first node 111, the second node 112, the fourth node 114, and/or any of the first device 130, and/or another structure in the communications system 100, through a sending port 1007, which may be in communication with the processor 1004, and the memory 1005.

Those skilled in the art will also appreciate that the units 1001-1003 described above may refer to a combination of analog and digital circuits, and/or one or more processors configured with software and/or firmware, e.g., stored in memory, that, when executed by the one or more processors such as the processor 1004, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The units 1001-1003 described above may be the processor 1004 of the third node 113, or an application running on such processor.

Thus, the methods according to the embodiments described herein for the third node 113 may be respectively implemented by means of a computer program 1008 product, comprising instructions, i.e., software code portions, which, when executed on at least one processor 1004, cause the at least one processor 1004 to carry out the actions described herein, as performed by the third node 113. The computer program 1008 product may be stored on a computer-readable storage medium 1009. The computer-readable storage medium 1009, having stored thereon the computer program 1008, may comprise instructions which, when executed on at least one processor 1004, cause the at least one processor 1004 to carry out the actions described herein, as performed by the third node 113. In some embodiments, the computer-readable storage medium 1009 may be a non-transitory computer-readable storage medium, such as a CD ROM disc, a memory stick, or stored in the cloud space. In other embodiments, the computer program 1008 product may be stored on a carrier containing the computer program, wherein the carrier is one of an electronic signal, optical signal, radio signal, or the computer-readable storage medium 1009, as described above.

The third node 113 may comprise an interface unit to facilitate communications between the third node 113 and other nodes or devices, e.g., the first node 111, the second node 112, the fourth node 114, and/or any of the first device 130, and/or another structure in the communications system 100. In some particular examples, the interface may, for example, include a transceiver configured to transmit and receive radio signals over an air interface in accordance with a suitable standard.

In other embodiments, the third node 113 may comprise the following arrangement depicted in FIG. 10*b*. The third node 113 may comprise a processing circuitry 1004, e.g., one or more processors such as the processor 1004, in the third node 113 and the memory 1005. The third node 113 may also comprise a radio circuitry 1010, which may comprise e.g., the receiving port 1006 and the sending port 1007. The processing circuitry 1004 may be configured to, or operable to, perform the method actions according to FIG. 5, and/or FIGS. 6-7, in a similar manner as that described in relation to FIG. 10*a*. The radio circuitry 1010 may be configured to set up and maintain at least a wireless connection with the the first node 111, the second node 112, the fourth node 114, and/or any of the first device 130, and/or another structure in the communications system 100.

Hence, embodiments herein also relate to the third node 113 operative for verifying the second node 112 as the server for the application, the third node 113 being operative to operate in the communications system 100. The third node 113 may comprise the processing circuitry 1004 and the memory 1005, said memory 1005 containing instructions executable by said processing circuitry 1004, whereby the third node 113 is further operative to perform the actions described herein in relation to the third node 113, e.g., in FIG. 5, and/or FIGS. 6-7.

Figure 11:
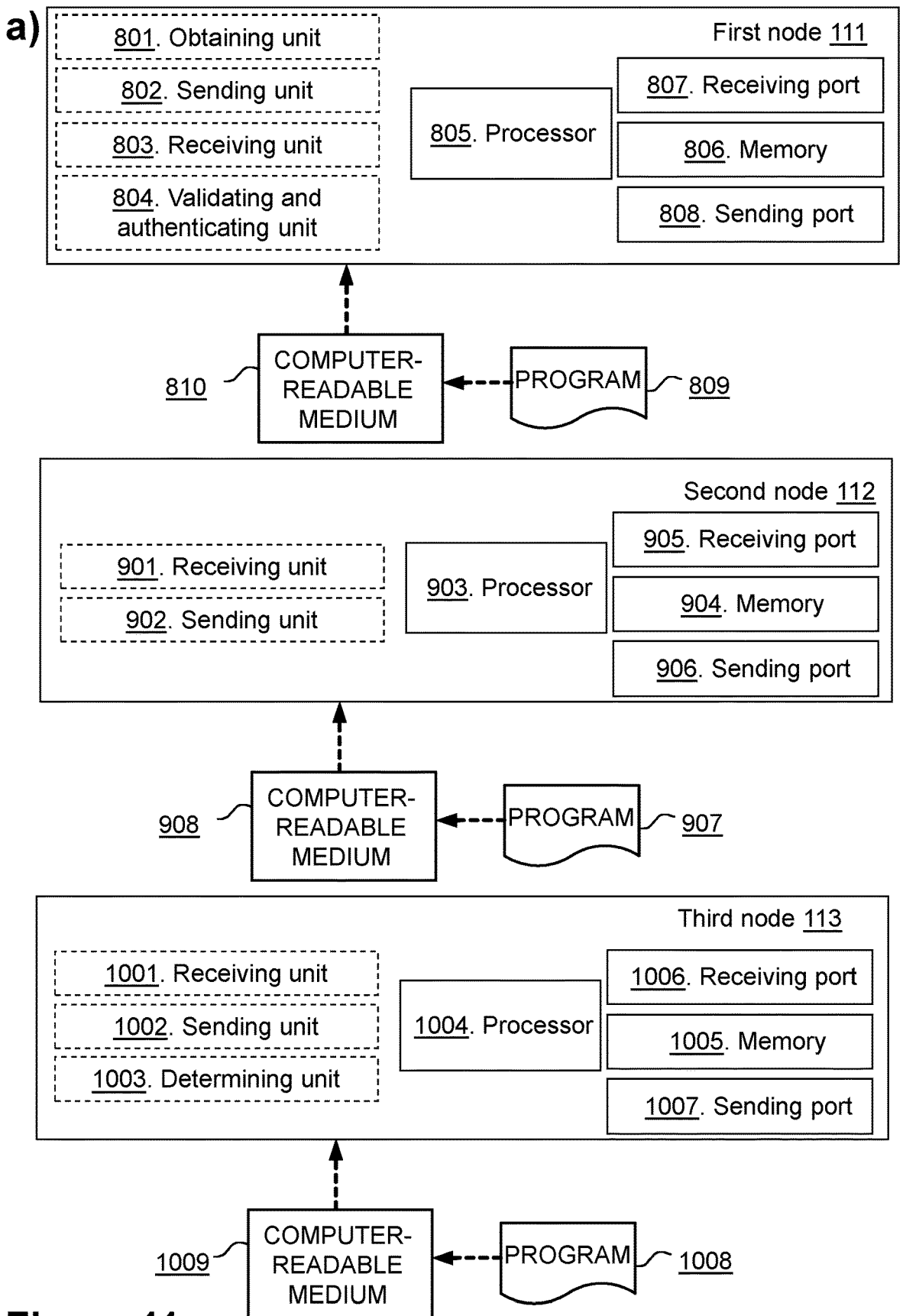
FIG. 11 is a schematic block diagram illustrating two non-limiting examples, a) and b), of a communications system, according to embodiments herein.
Figure 11:
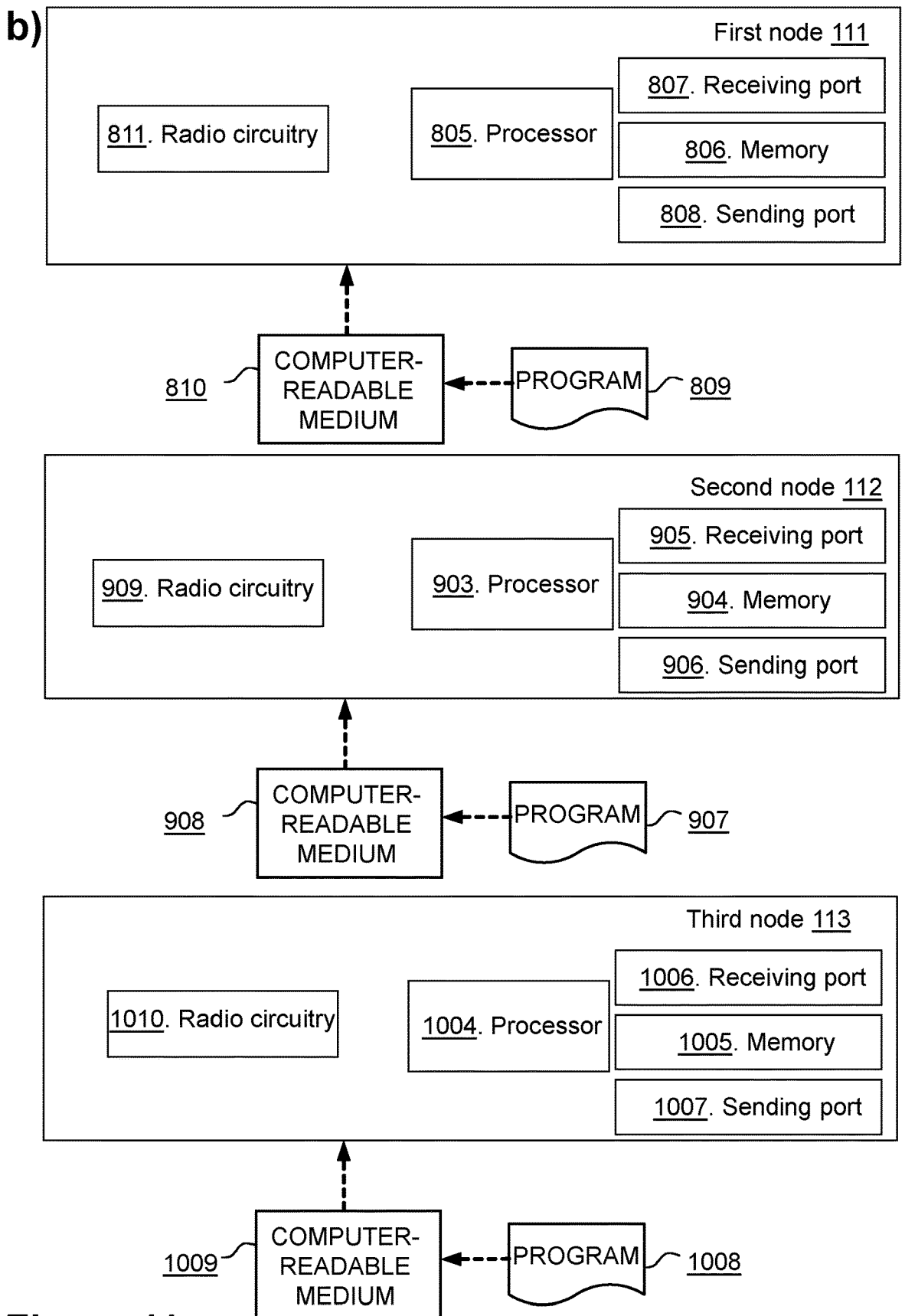

FIG. 11 depicts two different examples in panels a) and b), respectively, of the arrangement that the communications system 100 may comprise to perform the method actions described above in relation to FIG. 6. The arrangement depicted in panel a) corresponds to that described in relation to panel a) in FIG. 8, FIG. 9 and FIG. 10 for each of the first node 111, the second node 112 and the third node 113, respectively. The arrangement depicted in panel b) corresponds to that described in relation to panel b) in FIG. 8, FIG. 9 and FIG. 10 for each of the first node 111, the second node 112 and the third node 113, respectively. The communications system 100 may be for verifying the second node 112 as the server for the application. The communications system 100 is configured to comprise at least the first node 111, the second node 112 and the third node 113.

The third node 113 is configured to, e.g. by means of the receiving unit 1001 within the third node 113 configured to, receive, by the third node 113, from the first device 130 configured to operate in the communications system 100, the second connection request towards the second node 112. The second connection request is configured to comprise the first IP address corresponding to the second node 112, and the first domain for the application.

The communications system 100 is also configured to, e.g. by means of the sending unit 1002 within the third node 113 configured to, send, by the third node 113, to the first node 111, the first request to verify the first IP address for the first domain for the application. The first node 111 is configured to be different than the second node 112.

The communications system 100 is configured to, e.g. by means of the obtaining unit 801 within the first node 111 configured to, obtain, by the first node 111, the first request from the third node 113.

The communications system 100 is also configured to, e.g. by means of the sending unit 802 within the first node 111 configured to, send, by the first node 111, the first connection request to the second node 112 using the first IP address. The first connection request is configured to comprise the first domain configured to be indicated in the first request.

The communications system 100 is configured to, e.g. by means of the receiving unit 901 within the second node 112 configured to, receive, by the second node 112, the first connection request from the first node 111.

The communications system 100 is also configured to, e.g. by means of the sending unit 902 within the second node 112 configured to, send, by the second node 112, in response to the first connection request configured to be received, the indication to the first node 111. The indication is configured to comprise the certificate of the second node 112. The communications system 100 is configured to perform these actions in the absence of a subsequent request for application content application content from the first node 111 due to the inability of the first node 111 to request such content.

In some embodiments, the communications system 100 may be configured to, e.g. by means of the receiving unit 803 within the first node 111 configured to, receive, by the first node 111, in response to the first connection request configured to be sent, the indication from the second node 112.

In some embodiments, the communications system 100 may be configured to, e.g. by means of the validating and authenticating unit 804 within the first node 111 configured to, validate and authenticate, by the first node 111, the certificate as corresponding to the first domain.

The communications system 100 may be further configured to, e.g. by means of the sending unit 802 further configured to, send, by the first node 111, the message to the third node 113 based on the result of the validation and authentication.

The communications system 100 is configured to, e.g. by means of the receiving unit 1001 within the third node 113 configured to, receive, by the third node 113, in response to the first request configured to be sent, the message from the first node 111. The message is configured to indicate whether or not the second node 112 corresponding to the first IP address is the authentic owner of the first domain for the application.

In some embodiments, the communications system 100 may be further configured to, e.g. by means of the sending unit 802 further configured to, prior to sending the first connection request, send, by the first node 111, the second request to the fourth node 114 configured to operate in the communications system 100, thereby requesting the fourth node 114 to retrieve any previous authentication of the first IP address configured to be received.

In some embodiments, the communications system 100 may be further configured to, e.g. by means of the receiving unit 803 further configured to, prior to sending the first connection request, receive, by the first node 111, the response from the fourth node 114. The response may be configured to indicate whether or not the fourth node 114 was able to retrieve any previous authentication of the first IP address configured to be received.

The sending of the first connection request may be configured to be based on the response configured to be received.

In some embodiments, the sending of the first connection request may be configured to be performed with the proviso that one of: a) the fourth node 114 was unable to retrieve any stored domain corresponding to the received first IP address, and b) the previous authentication did not indicate the received first IP address is invalid for the first domain.

In some embodiments, the communications system 100 may be further configured to, e.g. by means of the sending unit 802 further configured to, after validating and authenticating the certificate as corresponding to the first domain, send, by the first node 111, the third request to the fourth node 114 to store the further indication configured to indicate the result of the validation and authentication. The sending of the third request may be configured to be performed one of: after every performance of the validation and authentication, and periodically.

In some embodiments, at least one of: a) the first domain may be configured to be the SNI, b) the certificate may be configured to comprise the Common Name, c) the first request may be configured to be the Nsaf_Authentication Request, d) the message may be configured to be the Nsaf_Authentication Response message, e) the first connection request may be configured to be the TLS Client Hello message, f) the indication may be configured to be the TLS Certificate message comprising the Common Name and the certificate corresponding to the second node 112, and g) the second connection request may be configured to be the TLS Client Hello message.

In some embodiments, the validating and authenticating the certificate may be further configured to comprise decrypting the certificate.

In some embodiments, the first node 111 and the third node 113 may be configured to be at least one of: co-localized and the same node.

In typical embodiments, the first node 111 and the third node 113 may be configured to be different nodes.

In some embodiments, the second node 112 may be configured to be one of the Application Server and the another node, and at least one of the following three options may apply.

According to a first option wherein the communications system 100 may be configured to be a 5G network, the first node 111 may be configured to be a first network function, and the third node 113 may be configured to be the UPF. The first node 111 may be referred to herein as the SAF, given the security functionality it performs.

According to the second option wherein the communications system 100 may be configured to be a 5G network, the third node 113 may be configured to be the first network function, e.g., the SAF, and the first node 111 may be configured to be the network node managed by the first party different than the second party managing the third node 113.

According to a third option the communications system 100 may be configured to be a 4G network. In some of such embodiments, the first node 111 may be configured to be the first network node and the third node 113 may be configured to be one of the PGW-U, and the TDF-U.

The communications system 100 may be further configured to, e.g. by means of the determining unit 1003 within the third node 113 configured to, prior to sending the first request to verify, determine, by the third node 113, whether or not the first domain for the application configured to be comprised in the second connection request configured to be received, has been previously authenticated. The sending of the first request to verify may be configured to be performed with the proviso that the third node 113 determines that the first domain lacks a previous authentication.

The remaining configurations described for the first node 111, the second node 112 and the third node 113 in relation to FIG. 11, may be understood to correspond to those described in FIG. 8, FIG. 9 and FIG. 10, respectively, and to be performed, e.g., by means of the corresponding units and arrangements described in FIG. 8, FIG. 9 and FIG. 10, which will not be repeated here.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCE

3GPP TS 23.501 V17.0.0 (March 2021) System architecture for the 5G System (5GS).

The invention claimed is:

1. A computer-implemented method, performed by communications system, for verifying a second node as a server for an application, the communications system comprising at least a first node, the second node and a third node, the method comprising:
   receiving, by the third node, from a first device operating in the communications system, a second connection request towards the second node, the second connection request comprising a first Internet Protocol, IP, address corresponding to the second node, and a first domain for the application,
   sending, by the third node, to the first node, a first request to verify the first IP address for the first domain for the application, the first node being different than the second node,
   obtaining, by the first node, the first request from the third node,
   sending, by the first node, a first connection request to the second node using the first IP address, the first connection request comprising the first domain indicated in the first request,
   receiving, by the second node, the first connection request from the first node,
   sending, by the second node, in response to the received first connection request, an indication to the first node, the indication comprising a certificate of the second node,
   wherein the method is performed in the absence of a subsequent request for application content from the first node due to an inability of the first node to request such content,
   receiving, by the first node, in response to the sent first connection request, the indication from the second node,
   validating and authenticating, by the first node, the certificate as corresponding to the first domain,
   sending, by the first node, a message to the third node based on a result of the validation and authentication, and
   receiving, by the third node, in response to the sent first request, the message from the first node, the message indicating whether or not a second node corresponding to the IP address is the authentic owner of the first domain for the application.

2. The computer-implemented method according to claim 1, wherein the method further comprises, prior to sending the first connection request:
   sending, by the first node, a second request to a fourth node operating in the communications system, thereby requesting the fourth node to retrieve any previous authentication of the received first IP address, and
   receiving, by the first node, a response from the fourth node, the response indicating whether or not the fourth node was able to retrieve any previous authentication of the received first IP address,
   and wherein the sending of the first connection request is based on the received response.

3. The computer-implemented method according to claim 2, wherein the sending of the first connection request is performed with the proviso that one of:
   a. the fourth node was unable to retrieve any stored domain corresponding to the received first IP address, and
   b. a previous authentication did not indicate the received first IP address is invalid for the first domain.

4. The computer-implemented method according to claim 2, wherein the method further comprises, after validating and authenticating the certificate as corresponding to the first domain:
   sending, by the first node, a third request to the fourth node to store a further indication indicating the result of the validation and authentication, the sending of the third request being performed one of: after every performance of the validation and authentication, and periodically.

5. The computer-implemented method according to claim 1, wherein at least one of:
   a. the first domain is a Server Name Indication, SNI,
   b. the certificate comprises a Common Name,
   c. the first request is a Nsaf_Authentication Request,
   d. the message is a Nsaf_Authentication Response message,
   e. the first connection request is a Transport Layer Security, TLS, Client Hello message,
   f. the indication is a TLS Certificate message comprising the Common Name and the certificate corresponding to the second node, and
   g. the second connection request is a Transport Layer Security, TLS, Client Hello message.

6. The computer-implemented method according to claim 5, wherein the validating and authenticating the certificate further comprises decrypting the certificate.

7. The computer-implemented method according to claim 1, wherein the first node and the third node are at least one of: co-localized and the same node.

8. The computer-implemented method according to claim 1, wherein the second node is one of an Application Server and another node, and wherein at least one of:
   a. the communications system is a 5G network, the first node is a first network function, and the third node is a User Plane Function,
   b. the communications system is a 5G network, the third node is a first network function, and the first node is a network node managed by a first party different than a second party managing the third node, and
   c. the communications system is a 4G network, the first node is a first network node and the third node is one of a Packet Data Network Gateway User Plane Function, PGW-U, and a Traffic Detection Function User Plane Function, TDF-U.

9. The computer-implemented method according to claim 1, wherein the method further comprises, prior to sending the first request to verify:
   determining, by the third node, whether or not the first domain for the application comprised in the received second connection request, has been previously authenticated,
   and wherein the sending of the first request to verify is performed with the proviso that the third node determines that the first domain lacks a previous authentication.

10. A communications system, for verifying a second node as a server for an application, the communications system being configured to comprise at least a first node, the second node and a third node, the communications system being further configured to:
   receive, by the third node, from a first device configured to operate in the communications system, a second connection request towards the second node, the second connection request being configured to comprise a first Internet Protocol, IP, address corresponding to the second node, and a first domain for the application,
   send, by the third node, to the first node, a first request to verify the first IP address for the first domain for the application, the first node being configured to be different than the second node,
   obtain, by the first node, the first request from the third node,
   send, by the first node, a first connection request to the second node using the first IP address, the first connection request being configured to comprise the first domain configured to be indicated in the first request,
   receive, by the second node, the first connection request from the first node,
   sending, by the second node, in response to the first connection request configured to be received, an indication to the first node, the indication being configured to comprise a certificate of the second node,
   wherein the communications system is configured to perform these actions in the absence of a subsequent request for application content from the first node due to an inability of the first node to request such content,
   receive, by the first node, in response to the first connection request configured to be sent, the indication from the second node,
   validate and authenticate, by the first node, the certificate as corresponding to the first domain,
   send, by the first node, a message to the third node based on a result of the validation and authentication, and
   receive, by the third node, in response to the first request configured to be sent, the message from the first node, the message being configured to indicate whether or not a second node corresponding to the IP address is the authentic owner of the first domain for the application.

11. The communications system according to claim 10, wherein the communications system is further configured to, prior to sending the first connection request:
   send, by the first node, a second request to a fourth node configured to operate in the communications system, thereby requesting the fourth node to retrieve any previous authentication of the first IP address configured to received be, and
   receive, by the first node, a response from the fourth node, the response being configured to indicate whether or not the fourth node was able to retrieve any previous authentication of the first IP address configured to be received,
   and wherein the sending of the first connection request is configured to be based on the response configured to be received.

12. The communications system according to claim 11, wherein the sending of the first connection request is configured to be performed with the proviso that one of:
   a. the fourth node was unable to retrieve any stored domain corresponding to the received first IP address, and
   b. a previous authentication did not indicate the received first IP address is invalid for the first domain.

13. The communications system according to claim 10, wherein the communications system is further configured to, after validating and authenticating the certificate as corresponding to the first domain:
send, by the first node, a third request to the fourth node to store a further indication configured to indicate the result of the validation and authentication, the sending of the third request being configured to be performed one of: after every performance of the validation and authentication, and periodically.

14. The communications system according to claim 10, wherein at least one of:
a. the first domain is configured to be a Server Name Indication, SNI,
b. the certificate is configured to comprise a Common Name,
c. the first request is configured to be a Nsaf_Authentication Request,
d. the message is configured to be a Nsaf_Authentication Response message,
e. the first connection request is configured to be a Transport Layer Security, TLS, Client Hello message,
f. the indication is configured to be a TLS Certificate message comprising the Common Name and the certificate is configured to correspond to the second node, and
g. the second connection request is configured to be a Transport Layer Security, TLS, Client Hello message.

15. The communications system according to claim 14, wherein the validating and authenticating the certificate is further configured to comprise decrypting the certificate.

16. The communications system according to claim 10, wherein the first node and the third node are configured to be at least one of: co-localized and the same node.

17. The communications system according to claim 10, wherein the second node is configured to be one of an Application Server and another node, and wherein at least one of:
a. the communications system is configured to be a 5G network, the first node is configured to be a first network function, and the third node is configured to be a User Plane Function,
b. the communications system is configured to be a 5G network, the third node is configured to be a first network function, and the first node is configured to be a network node managed by a first party different than a second party configured to be managing the third node, and
c. the communications system is configured to be a 4G network, the first node is configured to be a first network node and the third node is configured to be one of a Packet Data Network Gateway User Plane Function, PGW-U, and a Traffic Detection Function User Plane Function, TDF-U.

18. The communications system according to claim 10, wherein the communications system is further configured to, prior to sending the first request to verify:
determine, by the third node, whether or not the first domain for the application comprised in the second connection request configured to be received, has been previously authenticated,
and wherein the sending of the first request to verify is configured to be performed with the proviso that the third node determines that the first domain lacks a previous authentication.

* * * * *